United States Patent
Tsubaki

(10) Patent No.: US 10,562,562 B2
(45) Date of Patent: Feb. 18, 2020

(54) ELECTRIC POWER STEERING APPARATUS

(71) Applicant: NSK Ltd., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/341,100

(22) PCT Filed: Feb. 8, 2018

(86) PCT No.: PCT/JP2018/004398
§ 371 (c)(1),
(2) Date: Apr. 11, 2019

(87) PCT Pub. No.: WO2018/147371
PCT Pub. Date: Aug. 16, 2018

(65) Prior Publication Data
US 2019/0359248 A1 Nov. 28, 2019

(30) Foreign Application Priority Data
Feb. 9, 2017 (JP) .................................. 2017-022516
Feb. 9, 2017 (JP) .................................. 2017-022521
(Continued)

(51) Int. Cl.
 *B62D 5/04* (2006.01)
 *B62D 6/00* (2006.01)
(52) U.S. Cl.
 CPC ......... *B62D 5/0463* (2013.01); *B62D 5/0409* (2013.01); *B62D 6/008* (2013.01)
(58) Field of Classification Search
 CPC ..... B62D 5/0463; B62D 5/0409; B62D 6/008
 (Continued)

(56) References Cited

U.S. PATENT DOCUMENTS

| 2009/0112406 A1* | 4/2009 | Fujii | B62D 5/0463 |
| | | | 701/42 |
| 2010/0070137 A1* | 3/2010 | Yamaguchi | B62D 5/008 |
| | | | 701/41 |
| 2017/0349204 A1* | 12/2017 | Sakamaki | B62D 5/005 |

FOREIGN PATENT DOCUMENTS

| EP | 1923298 A1 | 5/2008 |
| JP | 2008216172 A | 9/2008 |

(Continued)

OTHER PUBLICATIONS

International Search Report of PCT/JP2018/004398 dated Apr. 24, 2018 [PCT/ISA/210].
(Continued)

*Primary Examiner* — Joseph M Rocca
*Assistant Examiner* — Felicia L. Brittman
(74) *Attorney, Agent, or Firm* — Sughrue Mion, PLLC

(57) ABSTRACT

An electric power steering apparatus that easily obtains equivalent steering torques to vehicle information such as a steering angle without being affected by a road surface state and aging-changes of mechanism characteristics of a steering system. The apparatus includes a torsion bar provided in a column shaft of a steering wheel of a vehicle, and assist-controls a steering system by driving and controlling a motor connected to the column shaft based on a current command value. A target steering torque generating section generates a target steering torque based on vehicle driving information, a converting section converts the target steering torque into a target torsional angle, and a torsional angle control section calculates the current command value so that a torsional angle of the torsion bar follows the target torsional angle; and performs a control so that a detection torque of the torsion bar follows a value depending on driving information.

18 Claims, 18 Drawing Sheets

(30)   Foreign Application Priority Data

Feb. 10, 2017   (JP) ................................. 2017-023025
Feb. 10, 2017   (JP) ................................. 2017-023026

(58)  Field of Classification Search
    USPC ........................................................ 180/443
    See application file for complete search history.

(56)            References Cited

FOREIGN PATENT DOCUMENTS

| JP | 2011-131629 A | 7/2011 |
| JP | 5208894 B2 | 6/2013 |
| JP | 2014-031120 A | 2/2014 |
| WO | 2016/072143 A1 | 5/2016 |

OTHER PUBLICATIONS

International Preliminary Report on Patentability of PCT/JP2018/004398 dated Nov. 19, 2018 [PCT/IPEA/409].

* cited by examiner

ELECTRIC POWER STEERING APPARATUS

CROSS REFERENCE TO RELATED APPLICATIONS

This application is a National Stage of International Application No. PCT/JP2018/004398, filed Feb. 8, 2018, claiming priorities to Japanese Patent Application Nos. 2017-022516 and 2017-022521, filed Feb. 9, 2017 and to Japanese Patent Application Nos. 2017-023025 and 2017-023026, filed Feb. 10, 2017.

TECHNICAL FIELD

The present invention relates to a high-performance electric power steering apparatus that obtains a desired steering torque by performing control so that a torsional angle of a torsion bar which is provided in a column shaft (a steering shaft, or a handle shaft) follows a value depending on vehicle driving information such as a steering angle, a vehicle speed and a steering state, and maintains the desired steering torque without being affected by a road surface state and aging-changes of mechanism system characteristics (friction, a motor output characteristic and the like).

BACKGROUND ART

An electric power steering apparatus (EPS) exists as an apparatus equipped with a motor control unit. The electric power steering apparatus which provides a steering system of a vehicle with an assist torque (a steering assist torque) by means of a rotational torque of a motor, and applies a driving force of the motor which is controlled by using an electric power supplied from an inverter as the assist torque to a steering shaft or a rack shaft by means of a transmission mechanism including a reduction mechanism. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through a reduction mechanism 3 (which is an engagement mechanism of a worm and a worm wheel, and whose reduction ratio is equal to "1/N"), universal joints 4a and 4b, a rack-and-pinion mechanism 5, and tie rods 6a and 6b, further via hub units 7a and 7b. In addition, a torque sensor 10 for detecting a steering torque Ts of the steering wheel 1 and a steering angle sensor 14 for detecting a steering angle θh are provided in the column shaft 2 having a torsion bar, and a motor 20 for assisting a steering force of the steering wheel 1 is connected to the column shaft 2 through the reduction mechanism 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command (a steering assist command) based on the steering torque Ts detected by the torque sensor 10 and a vehicle speed Vs detected by a vehicle speed sensor 12, and controls a current supplied to the motor 20 for the electric power steering apparatus (EPS) by means of a voltage control command value Vref obtained by performing compensation or the like to the current command value.

A controller area network (CAN) 40 exchanging various information of a vehicle is connected to the control unit 30, and it is possible to receive the vehicle speed Vs from the CAN 40. Further, it is also possible to connect a non-CAN 41 exchanging a communication, analog/digital signals, a radio wave or the like except for the CAN 40 to the control unit 30.

The control unit 30 mainly comprises a central processing unit (CPU) (including a micro controller unit (MCU), a micro processor unit (MPU) and so on), and general functions performed by programs within the CPU are shown in FIG. 2.

The control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 based on the inputted steering torque Ts and vehicle speed Vs and by using an assist map or the like. The current command value Iref1 is inputted into a current limiting section 33 through an adding section 32A. A current command value Irefm whose maximum current is limited is inputted into a subtracting section 32B, and a deviation I (=Irefm−Im) between the current command value Irefm and a motor current Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34-3 and an inertia 34-2 at an adding section 34-4, further adds the added result at the adding section 34-4 with a convergence 34-1 at an adding section 34-5, and then outputs the added result at the adding section 34-5 as the compensation signal CM.

Thus, in a conventional assist control, the steering torque (the torsional torque of the torsion bar) applied by a manual input of a driver is detected by a torque sensor, and the motor current is controlled as the assist current mainly depending on the detected steering torque. However, in this method, different steering torques can be generated depending on the steering angle due to a difference of a road surface state (for example, a cant of the road surface). Moreover, different steering characteristics are obtained depending on variations of a motor output characteristic due to the long-term use.

The apparatus disclosed in, for example, Japanese Patent No. 5208894 (Patent Document 1) is shown as a vehicle control unit to resolve the above problems. The apparatus of Patent Document 1 comprises a steering angle detecting means, a target setting means, and a control means to perform control so as to achieve a target value of a steering torque which is set by the target setting means, so as to apply an appropriate steering torque based on a tactile characteristic of a driver.

The List of Prior Art Documents

Patent Documents

Patent Document 1: Japanese Patent No. 5208894 B2

SUMMARY OF THE INVENTION

Problems to be Solved by the Invention

However, in the apparatus of Patent Document 1, it is required that a relationship between the steering angle and the steering torque is preliminarily obtained based on a relationship between the steering angle or the steering torque and a tactile amount (a grip force). Complicated operation that the steering torque corresponding to the steering angle is set as the target value based on the former relationship, occurs. Further, the apparatus of Patent Document 1 uses PI-control to a deviation between the target value of the steering torque and the detected steering torque.

The present invention has been developed in view of the above-described circumstances, and an object of the present invention is to provide an electric power steering apparatus that easily obtains equivalent steering torques to vehicle driving information such as a steering angle without being affected by a road surface state and aging-changes of mechanism characteristics (friction, a motor output characteristic and the like) of a steering system.

Means for Solving the Problems

The present invention relates to an electric power steering apparatus that comprises a torsion bar which is provided in a column shaft of a steering wheel of a vehicle, and assist-controls a steering system by driving and controlling a motor connected to the column shaft based on a current command value, the above-described object of the present invention is achieved by that comprising: a target steering torque generating section to generate a target steering torque based on vehicle driving information, a converting section to convert the target steering torque into a target torsional angle, and a torsional angle control section to calculate the current command value so that a torsional angle of the torsion bar follows the target torsional angle; wherein the electric power steering apparatus performs a control so that a detection torque of the torsion bar follows a value depending on the vehicle driving information.

The above-described object of the present invention is efficiently achieved by that wherein the torsional angle control section comprises a torsional angle feedback compensating section to output a first target column angular velocity corresponding to a deviation between the target torsional angle and the torsional angle, and a velocity control section to output the current command value based on the first target column angular velocity; or wherein the torsional angle control section further comprises a steering angle disturbance compensating section to output a second target column angular velocity corresponding to the vehicle driving information, and an angular velocity converting section to convert a motor angular velocity into a column angular velocity; or wherein, in the torsional angle control section, a third target column angular velocity that is a value obtained by adding the first target column angular velocity and the second target column angular velocity, and the column angular velocity are inputted into the velocity control section, and the velocity control section performs an integral of a deviation between the third target column angular velocity and the column angular velocity, subtracts a proportional value of the target column angular velocity from an integral value of the integral, and outputs the current command value; or wherein the torsional angle control section further comprises a stabilization compensating section to set a transfer function to the motor angular velocity for improving stability of an overall system; or wherein the transfer function is a primary filter or a second order filter; or wherein the torsional angle control section further comprises a stabilization compensating section to set a transfer function to the torsional angle for improving stability of an overall system; or wherein the torsional angle control section further comprises a stabilization compensating section to set a transfer function to a column angle for improving stability of an overall system; or wherein the transfer function is a second order filter or a fourth filter; or wherein a steering state which indicates right-turning or left-turning of the steering wheel is inputted into the target steering torque generating section; or wherein the target steering torque generating section comprises a basic map to output a first torque signal being vehicle speed sensitive, depending on the vehicle driving information, a damper gain section to output a second torque signal obtained by multiplying a differential value of the vehicle driving information by a vehicle speed sensitive damper gain, a hysteresis correcting section to output a third torque signal obtained by performing hysteresis correction to the vehicle driving information depending on the steering state, and an output section to output the target steering torque by adding at least one of the second torque signal and the third torque signal to the first torque signal; or wherein the vehicle speed sensitive damper gain has a characteristic where a value of the vehicle speed sensitive damper gain gradually increases as the vehicle speed increases; or wherein the hysteresis correcting section performs the hysteresis correction to the vehicle driving information using a function, switches the function when the steering state is switched to right turning or to left turning, and updates an offset adjustment value to the vehicle driving information when the function is switched; or wherein the offset adjustment value is calculated using previous values of the vehicle driving information and the third torque signal; or wherein a limiter which limits upper and lower limit values is disposed at a subsequent stage of the velocity control section; or wherein the torsional angle feedback compensating section is comprised of a gain value of a transfer function; or wherein the steering angle disturbance compensating section is comprised of a value of a transfer function for suppressing affection to the torsional angle due to variation of the vehicle driving information, and improving followability of the torsional angle to the target torsional angle against abrupt steering; or wherein a value of the transfer function of the steering angle disturbance compensating section is determined from a frequency transfer function of the steering system and a vehicle system model; or wherein the vehicle driving information includes a steering angle, a vehicle speed and a steering state.

Effects of the Invention

According to the electric power steering apparatus of the present invention, by generating the target torsional angle from the vehicle driving information such as the steering state which indicates right-turning or left-turning of the steering wheel, the vehicle speed and the steering angle, and appropriately processing the deviation between the target torsional angle and the detected torsional angle (for example, performing the velocity control by using the result, which is obtained by multiplying the deviation by the compensation value (the transfer function), as the target column velocity), the torsional angle can be operated so as to follow the target torsional angle, and the desired steering torque to the vehicle driving information such as the steering angle can be obtained.

Further, the steering angle disturbance compensating section in the torsional angle control is disposed. Thereby, an affection to a torsion bar torsional angle due to a change of a steering angle inputted from a driver can be suppressed, and followability of the torsional angle to the target torsional angle against abrupt steering can be improved.

Since the stabilization compensating section that has the transfer function which is required for the stabilization against the motor angular velocity, the torsional angle or the column angle, is provided, stabilization of the overall EPS control system can be achieved. Simply increasing the gain in order to make the torsional angle follow the target torsional angle, causes an oscillation or a vibration. However, the oscillation and the vibration can be suppressed by the feedback of the signal generated by the stabilization compensating section. The generation of the vibration which is generated in a high frequency band can be suppressed by disposing the stabilization compensating section. Consequently, the gain of the torsional angle feedback compensating section can increase, and the followability to the command value can also be improved.

MODE FOR CARRYING OUT THE INVENTION

The present invention is an electric power steering apparatus to obtain an equivalent steering torque corresponding to vehicle driving information such as a steering angle, a vehicle speed and a steering state without being affecting a road surface state, and obtains a desired steering torque by performing control so that a torsional angle of a torsion bar provided in a column shaft follows a value depending on the vehicle driving information.

Hereinafter, embodiments of the present invention will be described with reference to the accompanying drawings.

Figure 1:
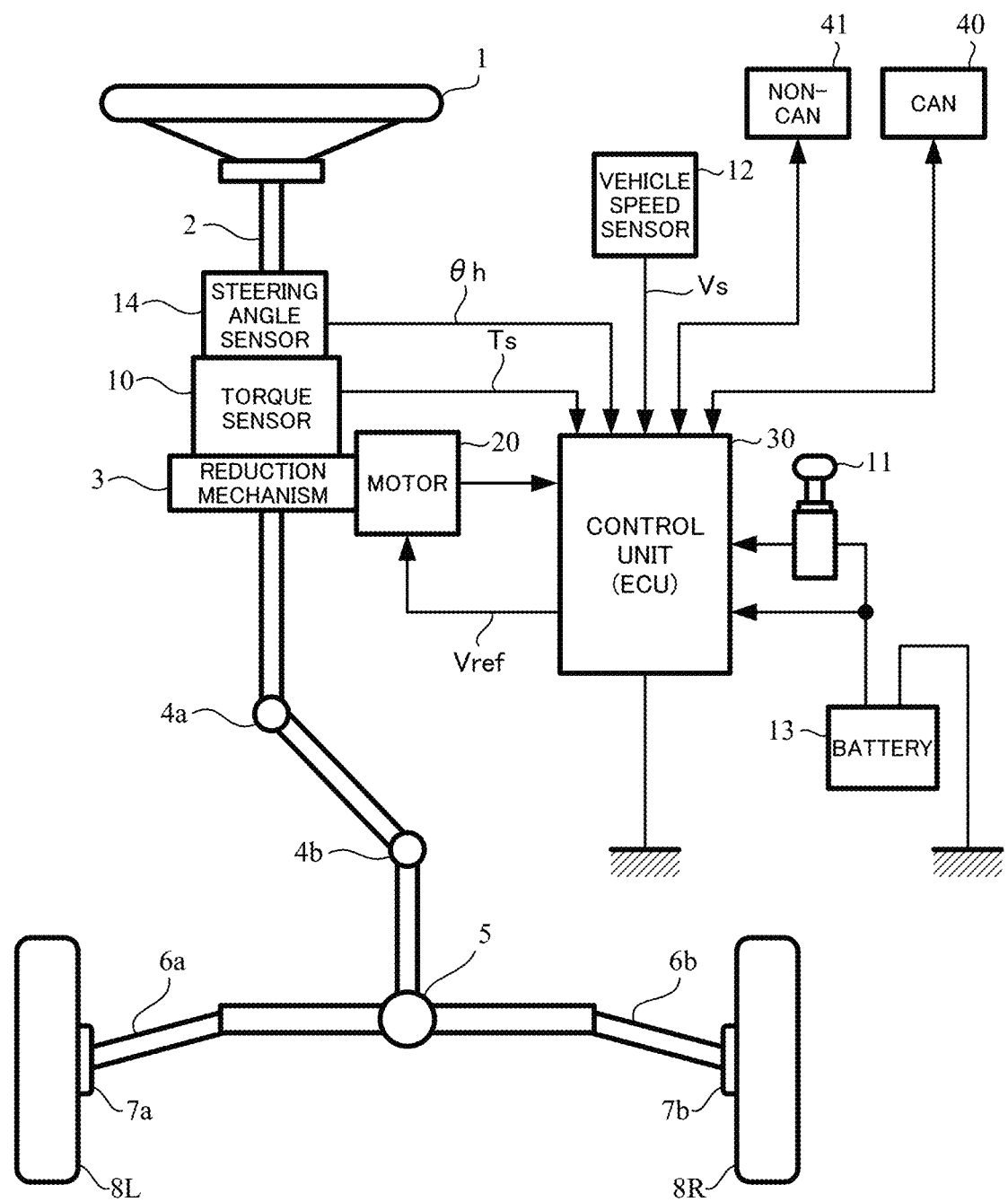
FIG. 1 is a configuration diagram illustrating a general outline of a conventional electric power steering apparatus (EPS)
Figure 2:
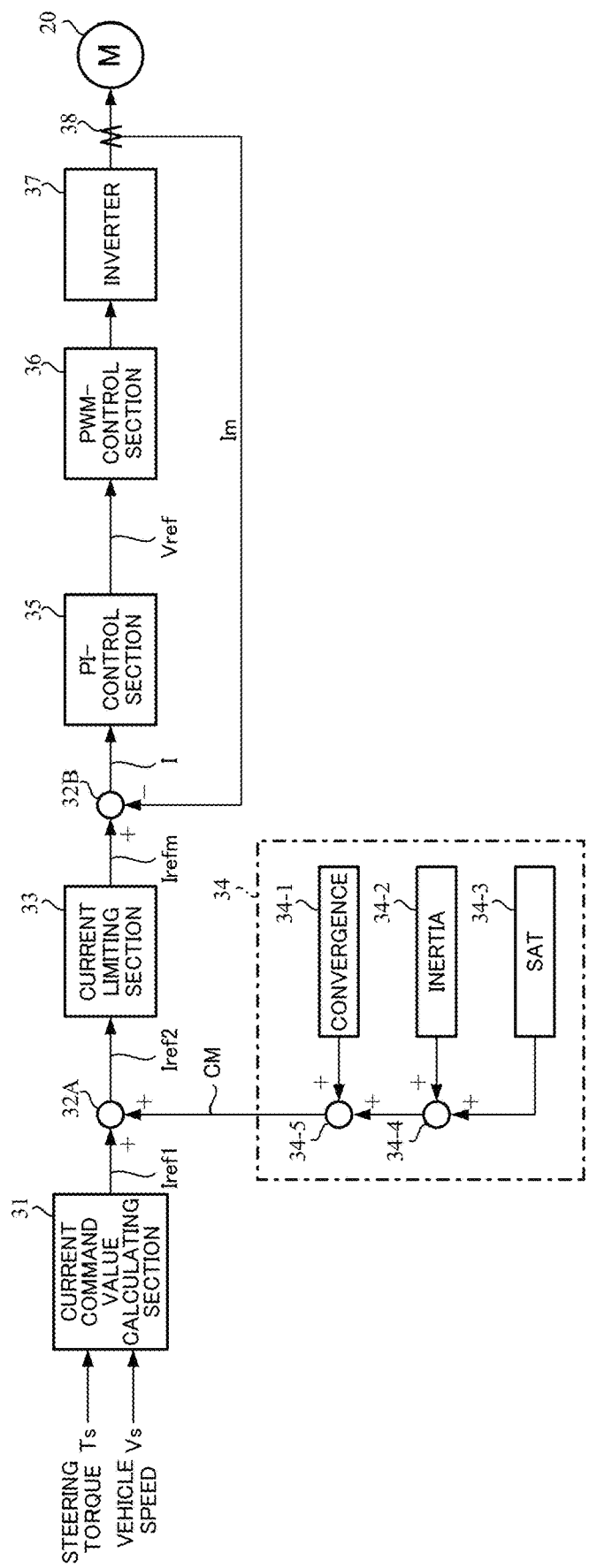
FIG. 2 is a block diagram showing a configuration example of a control unit (ECU) of the electric power steering apparatus.
Figure 3:
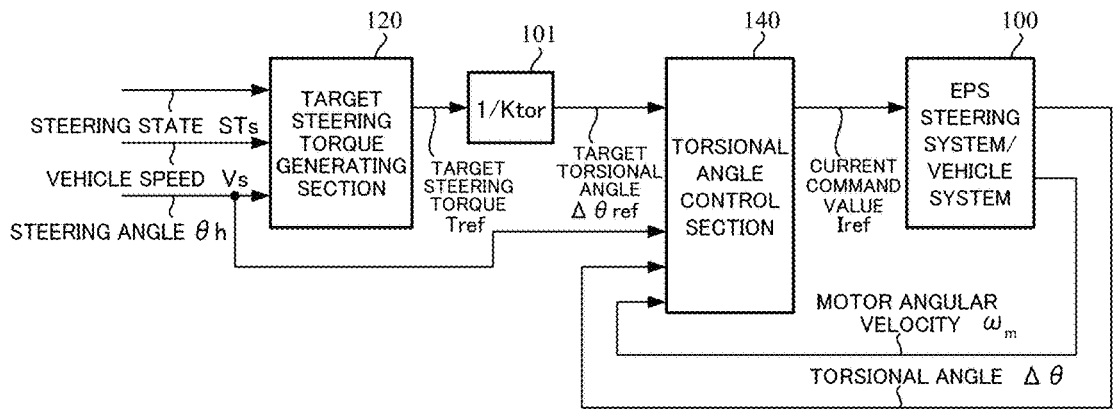
FIG. 3 is a block diagram showing a basic configuration example of the present invention.

FIG. 3 is a block diagram showing a basic configuration example of the present invention, and steering of a driver is assist-controlled by a motor in an EPS steering system/vehicle system 100. A steering state STs indicating right-turning or left-turning of the steering, a vehicle speed Vs and a steering angle θh are inputted into a target steering torque generating section 120 that outputs a target steering torque $T_{ref}$ depending on the vehicle driving information such as the steering angle θh. The target steering torque $T_{ref}$ generated by the target steering torque generating section 120 is converted into a target torsional angle $\Delta\theta_{ref}$ at a converting section 101 having a characteristic of "$1/K_{tor}$" in the case that a spring constant of the torsion bar 2A provided in the column shaft 2 is defined as $K_{tor}$. The target torsional angle $\Delta\theta_{ref}$ is inputted into a torsional angle control section 140. The target torsional angle $\Delta\theta_{ref}$, the steering angle θh, the torsional angle $\Delta\theta$ and a motor angular velocity $\omega_m$ are inputted into the torsional angle control section 140, and the torsional angle control section 140 calculates a current command value $I_{ref}$ so that the torsional angle $\Delta\theta$ becomes the target torsional angle $\Delta\theta_{ref}$. The motor of the EPS is driven by the current command value $I_{ref}$.

Figure 4:
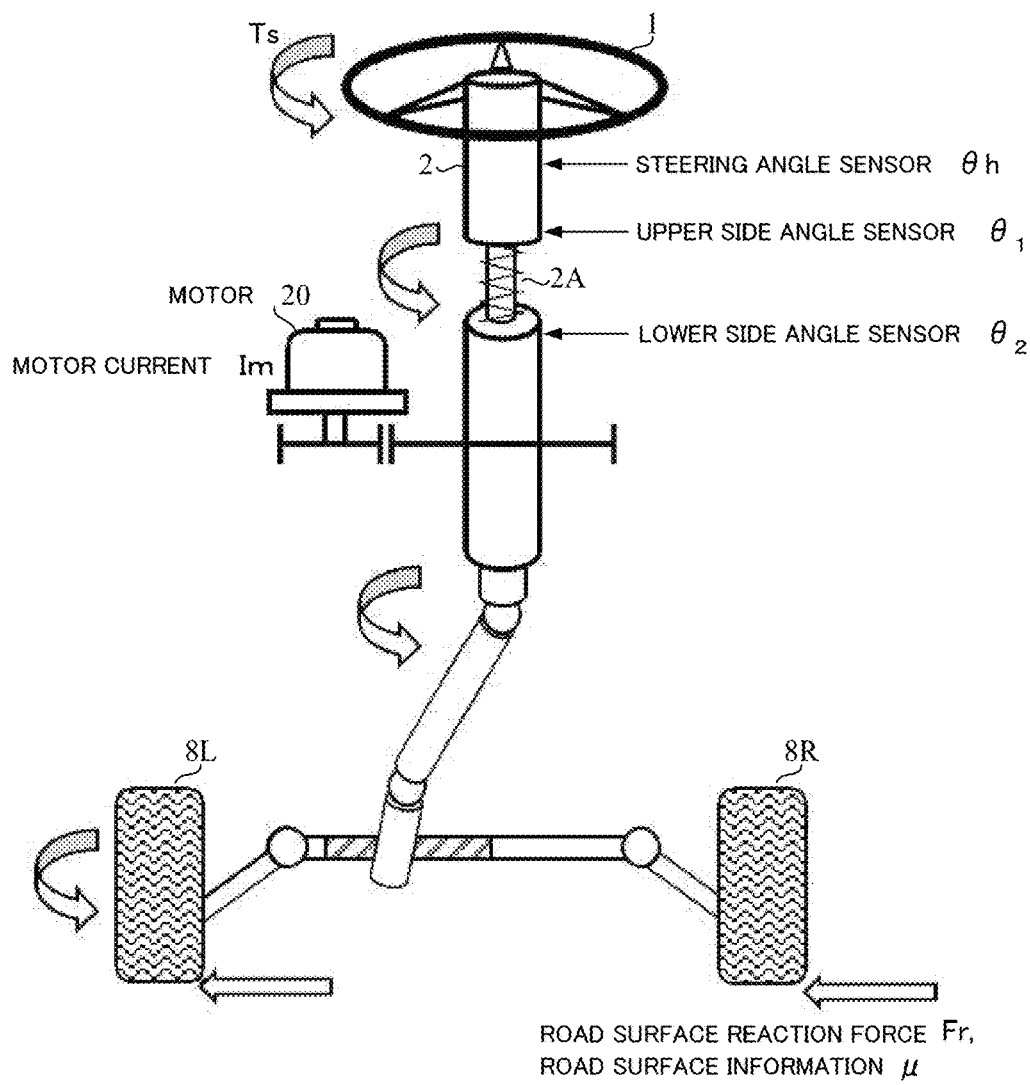
FIG. 4 is a structural diagram showing an installation example of an EPS steering system and various sensors.

An installation example of the EPS steering system and various sensors is shown in FIG. 4, and the torsion bar 2A is provided in the column shaft 2. Road surface reaction force Fr and road surface information p operate on steered wheels 8L and 8R. An upper side angle sensor (an angle $\theta_1$) is disposed at a steering wheel side of the column shaft 2 above the torsion bar 2A, and a lower side angle sensor (an angle $\theta_2$) is disposed at a steered wheel side of the column shaft 2 below the torsion bar 2A. The steering angle $\theta h$ is detected by a steering angle sensor disposed at an upper portion of the column shaft 2. The torsion bar torsional angle $\Delta\theta$ and the torsion bar torque Tt can be calculated by the following expressions 1 and 2 from a deviation between the angle $\theta_1$ of the upper side angle sensor and the angle $\theta_2$ of the lower side angle sensor. In the expression 2, $K_{tor}$ is a spring constant of the torsion bar 2A.

$$\theta_1 - \theta_2 = \Delta\theta \qquad \text{[Expression 1]}$$

$$K_{tor} \cdot \Delta\theta = K_{tor} \cdot (\theta_1 - \theta_2) = Tt \qquad \text{[Expression 2]}$$

The torsion bar torque Tt can be detected by using the torque sensor disclosed in, for example, Japanese Unexamined Patent Publication No. 2008-216172 A. The steering state STs of right-turning or left-turning of the steering can be obtained by using a relationship between the steering angle $\theta h$ and the motor angular velocity $\omega_m$ as shown in, for example, FIG. 5.

In such a configuration, an operating example of the present invention will be described with reference to a flowchart of FIG. 6.

At first, the steering angle $\theta h$, the steering state STs and the vehicle speed Vs are inputted into the target steering torque generating section 120 (Step S1), and the target steering torque generating section 120 generates the target steering torque $T_{ref}$ (Step S10). The target steering torque $T_{ref}$ is inputted into the converting section 101, and the converting section 101 converts the target steering torque $T_{ref}$ into the target torsional angle $\Delta\theta_{ref}$ (Step S30). The target torsional angle $\Delta\theta_{ref}$, the steering angle $\theta h$, the torsional angle $\Delta\theta$ and the motor angular velocity $\omega_m$ are inputted into the torsional control section 140 (Step S31). The torsional angle control section 140 calculates the current command value $I_{ref}$ so that the torsional angle $\Delta\theta$ follows the target torsional angle $\Delta\theta_{ref}$ (Step S40), drives the motor based on the current command value $I_{ref}$, and performs current control (Step S60).

Figure 6:
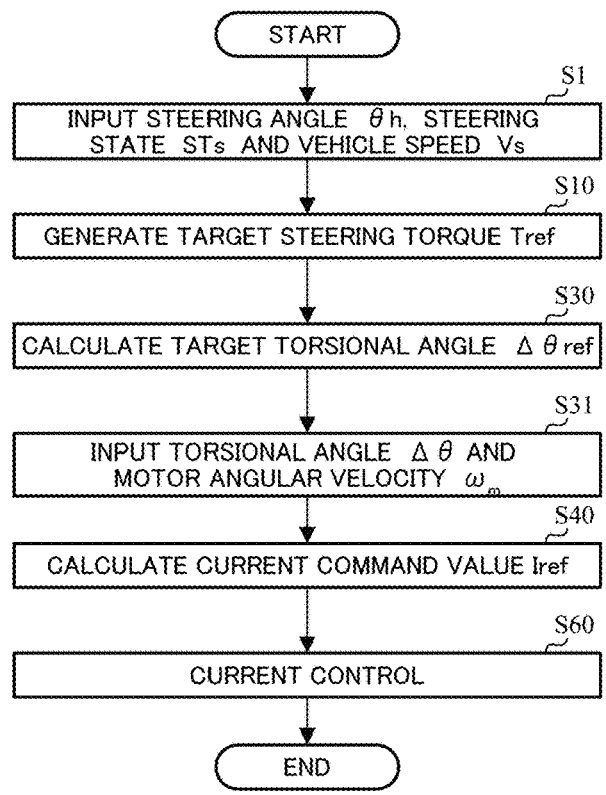
FIG. 6 is a flowchart showing a basic operating example of the present invention.

An input order of the data in FIG. 6 is appropriately changeable.

Figure 7:
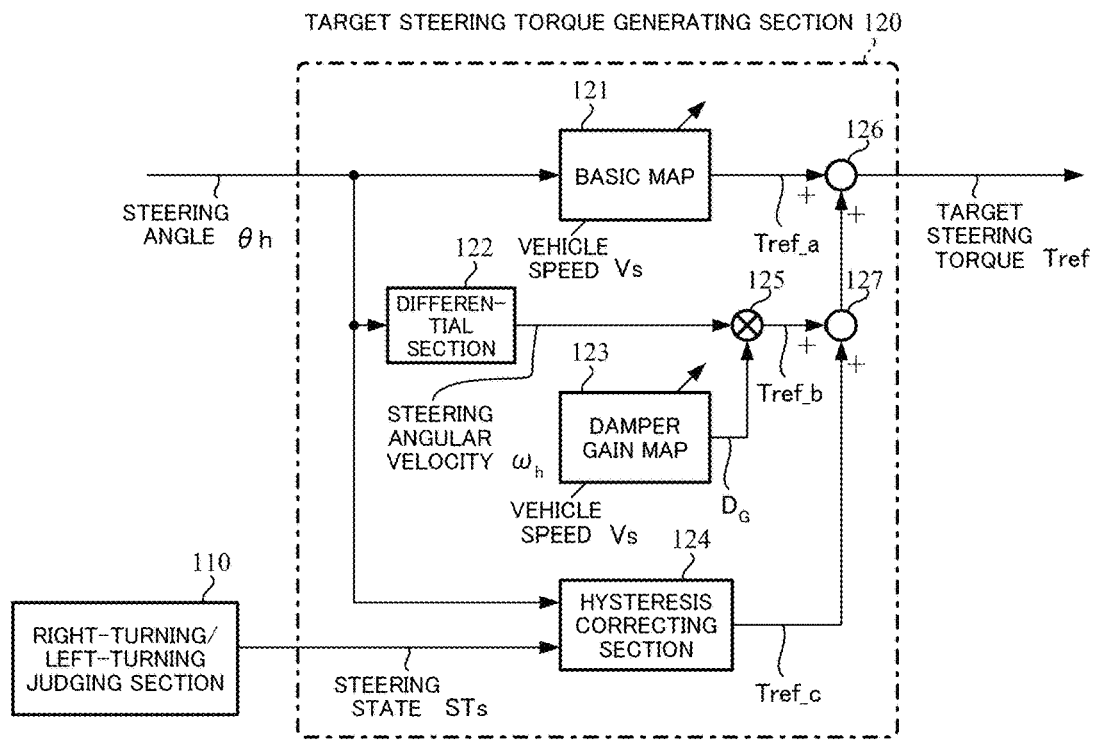
FIG. 7 is a block diagram showing a configuration example of a target steering torque generating section.
Figure 8:
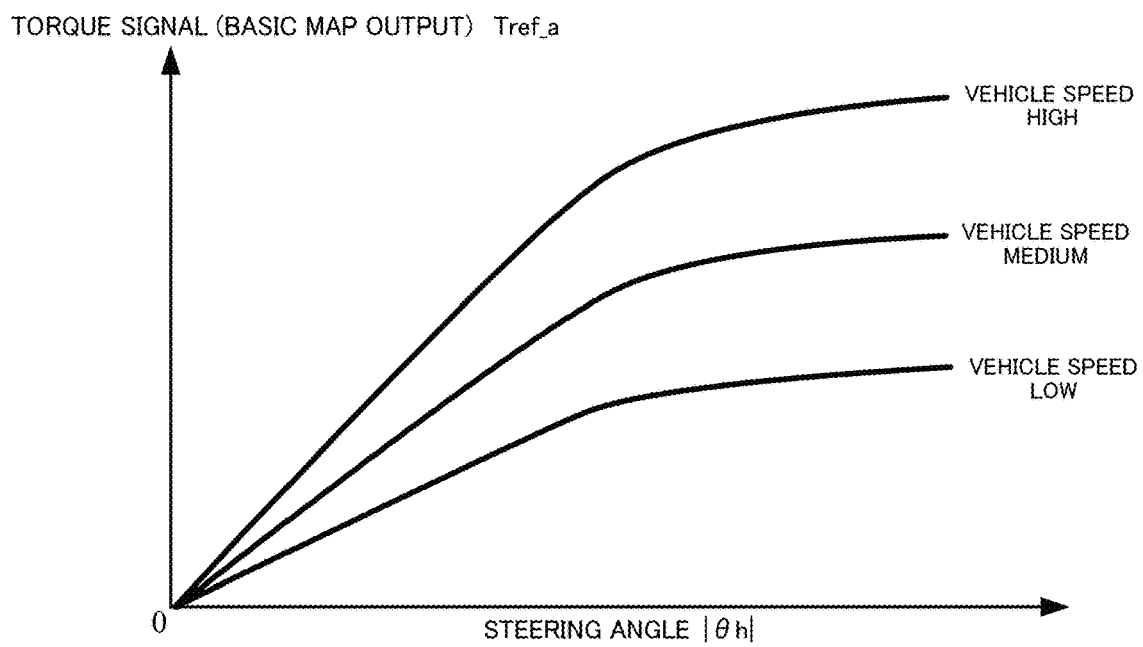
FIG. 8 is a graph showing a characteristic example of a basic map.

FIG. 7 shows a configuration example of the target steering torque generating section 120, and the steering angle $\theta h$ is inputted into a basic map 121, a differential section 122 and a hysteresis correcting section 124. The basic map 121 outputs a torque signal $T_{ref\_a}$ whose parameter is the vehicle speed Vs as shown in FIG. 8. In FIG. 8, the basic map 121 is configured by using an absolute value $|\theta h|$ of the steering angle $\theta h$. Alternatively, the basic map 121 may output the torque signal $T_{ref\_a}$ depending on the positive value or the negative value of the steering angle $\theta h$. The torque signal $T_{ref\_a}$ is inputted into an adding section 126.

Figure 9:
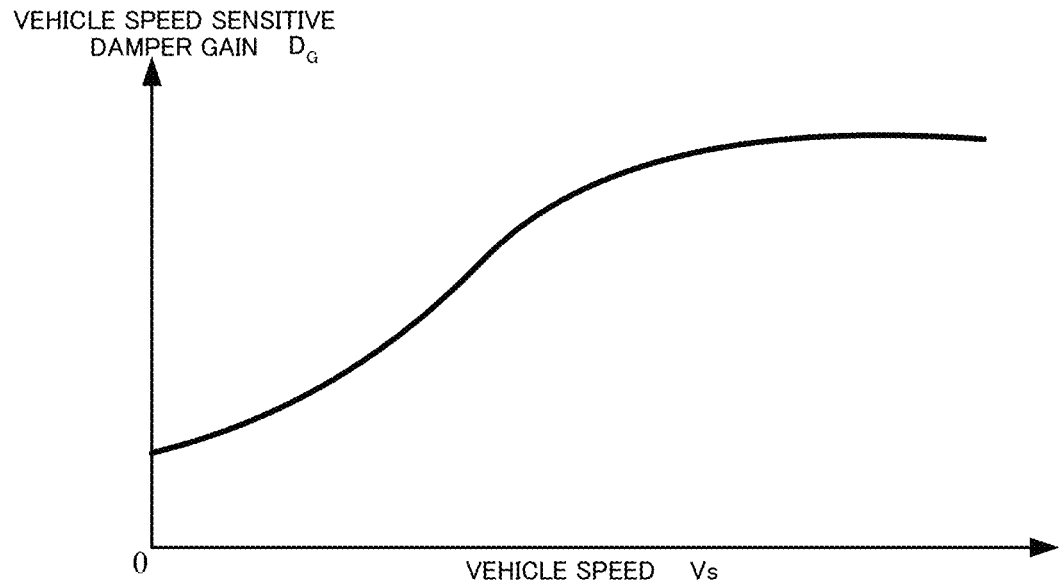
FIG. 9 is a graph showing a characteristic example of a vehicle speed sensitive damper gain map.

The steering angular velocity $\omega_h$ which is obtained by differentiating the steering angle $\theta h$ is outputted from a differential section 122, and the steering angular velocity $\omega_h$ is inputted into a multiplying section 125. A vehicle speed sensitive damper gain $D_G$ is inputted into the multiplying section 125. A torque signal $T_{ref\_b}$ which is a multiplied result ($=D_G \cdot \omega_h$) is inputted into an adding section 127. The vehicle speed sensitive damper gain $D_G$ is outputted from a damper gain map 123 being vehicle speed sensitive, depending on the vehicle speed Vs. For example, as shown in FIG. 9, the vehicle speed sensitive damper gain $D_G$ has a characteristic where the value gradually increases when the vehicle speed Vs is higher. A damper gain section comprises the damper gain map 123 and the multiplying section 125.

Figure 5:
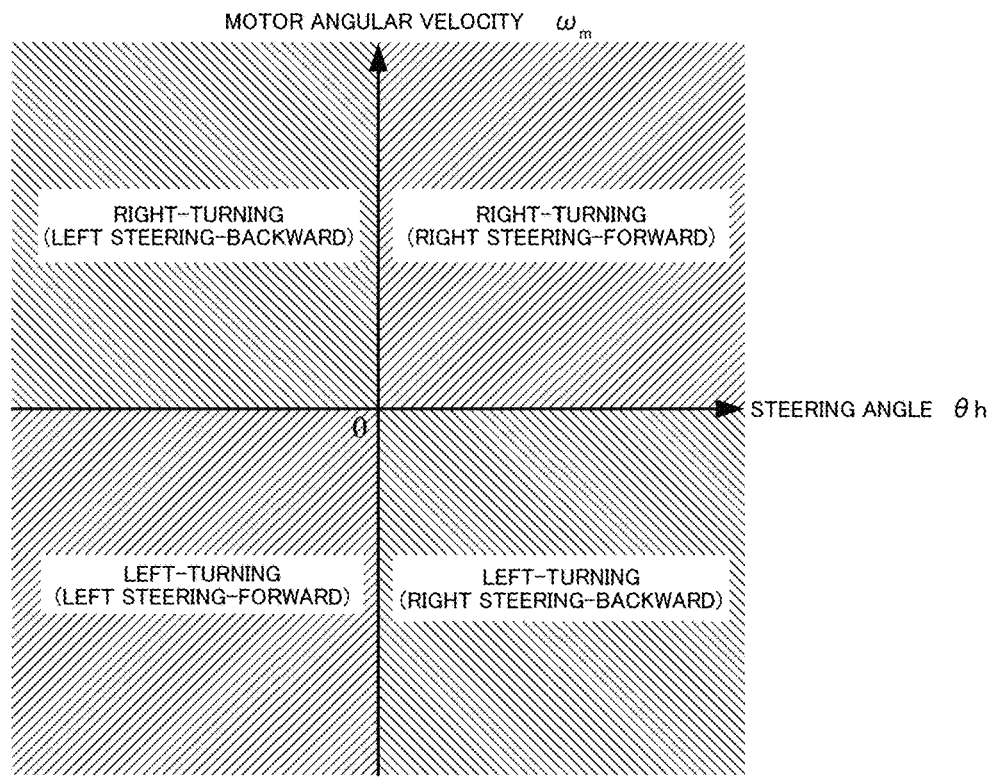
FIG. 5 is a graph for explaining right-turning and left-turning of steering.

A right-turning/left-turning judging section 110 performs a judgment, for example, as shown in FIG. 5. The steering state STs which is a judgment result is inputted into the hysteresis correcting section 124. The steering angle $\theta h$ is also inputted into the hysteresis correcting section 124, and the hysteresis correcting section 124 calculates a torque signal $T_{ref\_c}$ based on the steering angle $\theta h$ and the steering state STs in accordance with the following expression 3. In the following expression 3, x, $y_R$ and $y_L$ are set to $\theta h$, $T_{ref\_c}$ and $T_{ref\_c}$, respectively (x=$\theta h$, $y_R$=$T_{ref\_c}$ and $y_L$=$T_{ref\_c}$), and a>1 and c>0 are satisfied.

when right-turning $y_R = A_{hys}\{1 - a^{-c(x-b)}\}$ when left-turning $y_L = A_{hys}\{1 - a^{-c(x-b')}\}$ [Expression 3]

When switching from the right-turning steering to the left-turning steering and when switching from the left-turning steering to the right-turning steering, based on the final coordinates (x1, y1) which are previous values of the steering angle $\theta h$ and the torque signal $T_{ref\_c}$ when switching, a value "b" of the following expression 4 is substituted into the value "b" which is an offset adjustment value of the x-direction in the expression 3 after switching. Thereby, continuity when switching the steering is maintained.

$$\text{when right-turning } b = x_1 + \frac{1}{c}\log_a\left(1 - \frac{y_1}{A_{hys}}\right) \qquad \text{[Expression 4]}$$

$$\text{when left-turning } b' = x_1 - \frac{1}{c}\log_a\left(1 + \frac{y_1}{A_{hys}}\right)$$

The above expression 4 can be derived by substituting "x1" into "x" and substituting "y1" into "$y_R$" and "$y_L$" in the above expression 3.

Any positive number which is larger than "1", can be used in the variable "a". For example, in the case of using a Napier's constant "e", the expressions 3 and 4 can be expressed by the following expressions 5 and 6.

when right-turning $y_R = A_{hys}[1 - \exp\{-c(x-b)\}]$ when left-turning $y_L = -A_{hys}[1 - \exp\{c(x-b')\}]$ [Expression 5]

$$\text{when right-turning } b = x_1 + \frac{1}{c}\log_e\left(1 - \frac{y_1}{A_{hys}}\right) \qquad \text{[Expression 6]}$$

$$\text{when left-turning } b' = x_1 - \frac{1}{c}\log_e\left(1 + \frac{y_1}{A_{hys}}\right)$$

Figure 10:
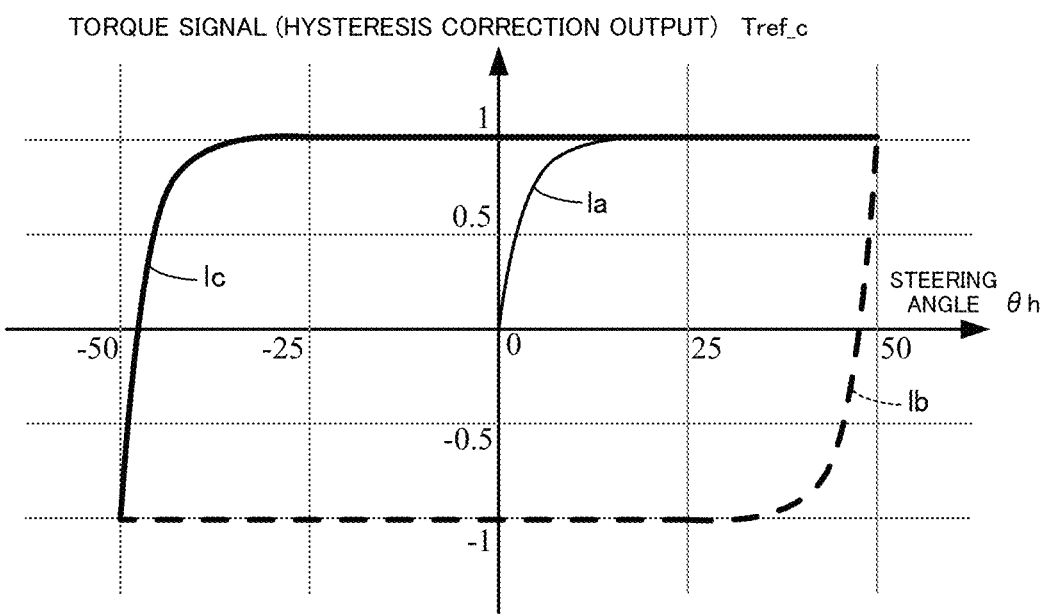
FIG. 10 is a graph showing a characteristic example of a hysteresis correcting section.

Setting $A_{hys}$=1 [Nm] and c=0.3 in the expressions 5 and 6, in the case that an initial angle of the steering wheel is 0 [deg] and the steering wheel is steered between +50 [deg] and −50 [deg], a changing example of the torque signal $T_{ref\_c}$ which the hysteresis correction is applied to is shown in FIG. 10. That is, the torque signal $T_{ref\_c}$ from the hysteresis correcting section 124 has a hysteresis characteristic shown by "an origin point→1a (the thin line)→1b (the broken line)→1c (the bold line)".

The judgment method in the right-turning/left-turning judging section 110 is not limited to the judgment shown in FIG. 5. For example, the right-turning/left-turning judging section 110 may confirm whether the current value of the steering angle θh is changed in a positive direction to the previous value (an increase amount is zero or more) or in a negative direction to the previous value (the increase amount is less than zero), and may perform the judgment based on the above changing direction. Instead of the steering angle θh, the angle $\theta_1$ of the upper side angle sensor may be used.

In such a configuration, an operating example of the target steering torque generating section 120 (the step S10 in FIG. 6) will be described with reference to a flowchart of FIG. 11.

At first, the steering angle θh and the vehicle speed Vs are inputted into the basic map 121 (Step S11), and the basic map 121 generates and outputs the torque signal $T_{ref\_a}$ depending on the steering angle θh and the vehicle speed Vs in accordance with the characteristic shown in FIG. 8 (Step S12). The steering angle θh is also inputted into the differential section 122 and the hysteresis correcting section 124. The differential section 122 differentiates the steering angle θh and outputs the steering angular velocity $\omega_h$ (Step S13). The damper gain map 123 outputs the vehicle speed sensitive damper gain $D_G$ depending on the vehicle speed Vs (Step S14). The multiplying section 125 multiplies the steering angular velocity $\omega_h$ by the vehicle speed sensitive damper gain $D_G$, and outputs the torque signal $T_{ref\_b}$. The torque signal $T_{ref\_b}$ is inputted into the adding section 127 (Step S15).

The right-turning/left-turning judging section 110 judges the right-turning or the left-turning, and the steering state STs being the judged result is inputted into the hysteresis correcting section 124 (Step S16). The hysteresis correcting section 124 performs the hysteresis correction corresponding to the steering angle θh by the calculations of the expressions 5 and 6 depending on the steering state STs (Step S17), and generates the torque signal $T_{ref\_c}$ (Step S18). The torque signal $T_{ref\_c}$ is inputted into the adding section 127.

The torque signals $T_{ref\_a}$, $T_{ref\_b}$ and $T_{ref\_c}$ obtained as described above, are added at the adding sections 126 and 127 by which the output section is constituted, and the target steering torque $T_{ref}$ is calculated (Step S19). That is, the torque signals $T_{ref\_b}$ and $T_{ref\_c}$ are added at the adding section 127, the torque signal $T_{ref\_a}$ is added to the added result at the adding section 126, and the added result at the adding section 126 is outputted as the target steering torque $T_{ref}$.

Figure 11:
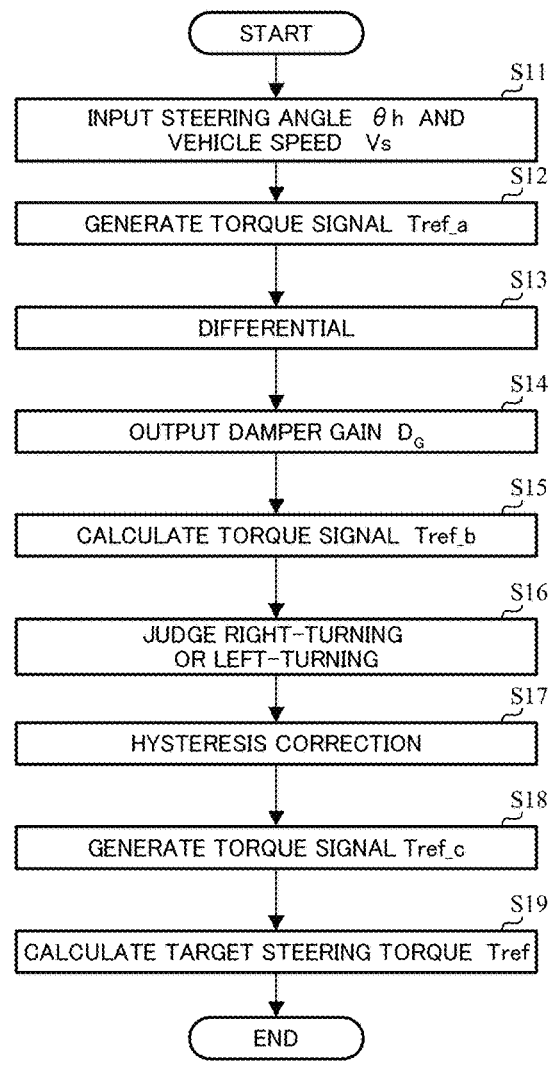
FIG. 11 is a flowchart showing an operating example of the target steering torque generating section.

The orders of the data input, the calculation and the like in FIG. 11 are appropriately changeable.

Figure 12:
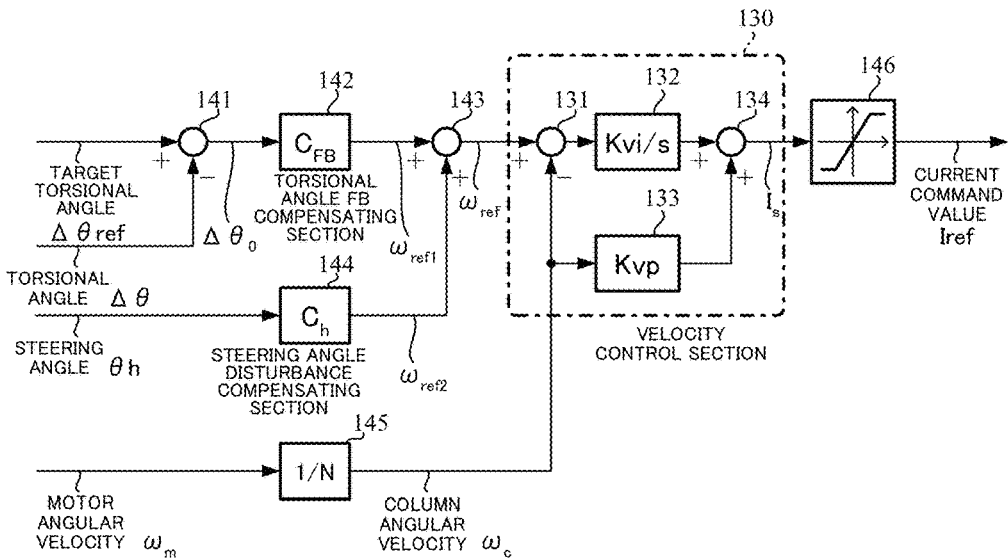
FIG. 12 is a block diagram showing a configuration example (a first embodiment) of a torsional angle control section.

FIG. 12 is a block diagram showing a configuration example of the torsional angle control section 140 (a first embodiment), a deviation $\Delta\theta_0$ between the target torsional angle $\Delta\theta_{ref}$ and the torsional angle $\Delta\theta$ is calculated at a subtracting section 141, and the deviation $\Delta\theta_0$ is inputted into a torsional angle feedback (FB) compensating section 142 having a compensation value $C_{FB}$ (a transfer function). The torsional angle FB compensating section 142 multiplies the deviation $\Delta\theta_0$ by the compensation value $C_{FB}$ (the transfer function), and outputs a target column angular velocity $\omega_{ref1}$ so that the torsional angle $\Delta\theta$ follows the target torsional angle $\Delta\theta_{ref}$. The target column angular velocity $\omega_{ref1}$ is inputted into an adding section 143. The compensation value $C_{FB}$ may be a simple gain $K_{pp}$, or may be a compensation value of the PI-control or the like.

The steering angle θh is inputted into a steering angle disturbance compensating section 144 having a compensation value Ch (a transfer function). The steering angle disturbance compensating section 144 multiplies the steering angle θh by the compensation value Ch (the transfer function), and outputs a target column angular velocity $\omega_{ref2}$. By using the steering angle disturbance compensating section 144, affection to the torsion bar torsional angle Δθ due to a change of the steering angle θh inputted from a driver can be suppressed, and followability of the torsional angle Δθ to the target torsional angle Δθref against abrupt steering can be improved. The target column angular velocities $\omega_{ref1}$ and $\omega_{ref2}$ are added at an adding section 143, and the added result is defined as a target column angular velocity $\omega_{ref}$. The target column angular velocity $\omega_{ref}$ is inputted into a velocity control section 130 which performs a proportional preceding type PI-control (an I-P control). When the steering angle θh is changed by the steering of the driver, the change affects the torsional angle Δθ as a disturbance, and variation to the target torsional angle $\Delta\theta_{ref}$ occurs. Especially, this variation remarkably appears in the abrupt steering. A basic object of the steering angle disturbance compensating section 144 is to reduce the affection of the steering angle θh as this disturbance. By determining the transfer function Ch of the steering angle disturbance compensating section 144 based on a frequency transfer characteristic of a plant model described below, or the like, the affection of the disturbance can be suppressed.

The velocity control section 130 which performs the I-P control calculates the current command value Is so that a column angular velocity $\omega_c$ follows the target column angular velocity $\omega_{ref}$. As shown in FIG. 12, the column angular velocity $\omega_c$ may be calculated by multiplying the motor angular velocity $\omega_m$ by a reduction ratio "1/N" of a reduction ratio section 145 which is a reduction mechanism. A limiter 146 that limits the upper and lower limit values of the current command value Is from the velocity control section 130, and outputs the current command value $I_{ref}$, is disposed at a subsequent stage of the velocity control section 130.

Figure 13:
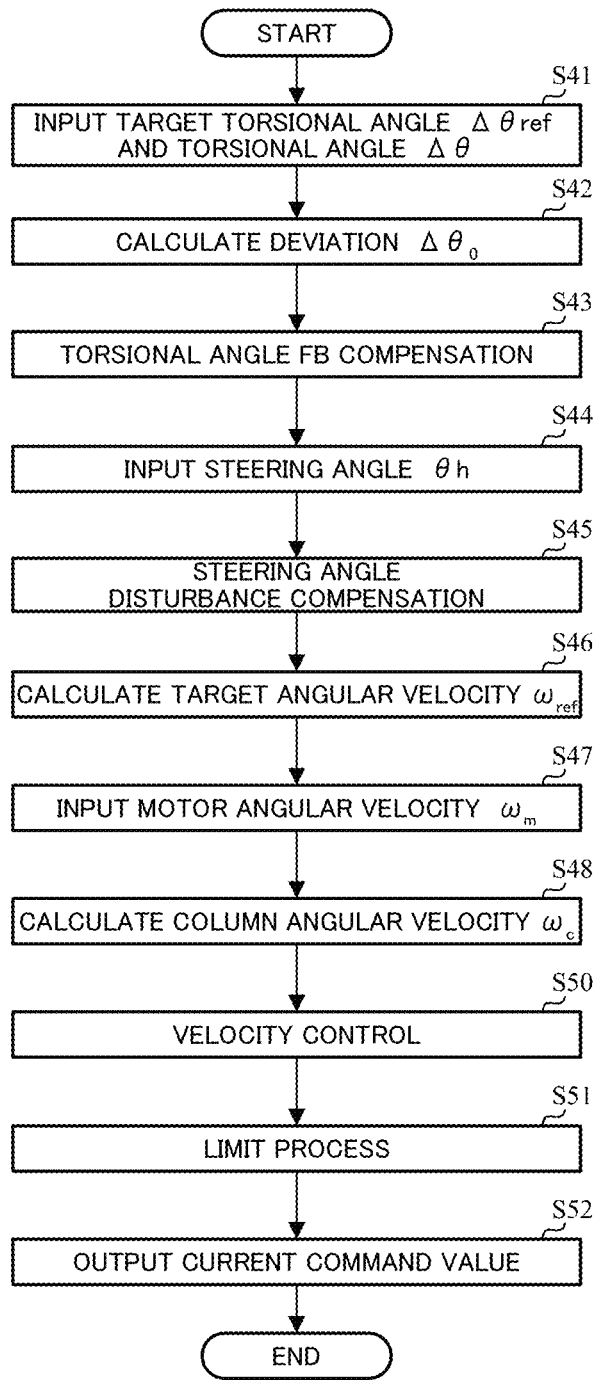
FIG. 13 is a flowchart showing an operating example (the first embodiment) of the torsional angle control section.

In such a configuration, an operating example of the torsional angle control section 140 (the step S40 in FIG. 6) will be described with reference to a flowchart of FIG. 13.

At first, the target torsional angle $\Delta\theta_{ref}$ and the torsional angle Δθ are inputted into a subtracting section 141 (Step S41), and the subtracting section 141 calculates the deviation $\Delta\theta_0$ (Step S42). The deviation $\Delta\theta_0$ is inputted into the torsional angle FB compensating section 142, and is compensated (Step S43). The compensated target column angular velocity $\omega_{ref1}$ is inputted into the adding section 143. Next, the steering angle θh is inputted into the steering angle disturbance compensating section 144 (Step S44), and is compensated (Step S45). The compensated target column angular velocity $\omega_{ref2}$ is inputted into the adding section 143 (Step S46). The target column angular velocity $\omega_{ref}$ which is the added result at the adding section 143 is inputted into the velocity control section 130.

The motor angular velocity $\omega_m$ is multiplied by "1/N" at the reduction ratio section 145 (Step S47), and the column angular velocity $\omega_c$ which is the multiplied result is inputted into the velocity control section 130 (Step S48). A difference between the target column angular velocity $\omega_{ref}$ and the column angular velocity $\omega_c$ is obtained at the subtracting section 131. The difference is integrated (Kvi/s) at an integral section 132, and the integrated result is inputted into an adding section 134 (Step S50). A proportional process (Kvp) is performed to the column angular velocity $\omega_c$ at a proportional section 133, and the proportional-processed result is inputted into the adding section 134 (Step S50). The limiter 146 limits the upper and lower limit values of the current command value Is which is the added result at the adding section 134 (Step S51). The current command value Iref for the motor control is outputted from the limiter 146 (Step S52).

If the torsional angle control section 140 comprises the torsional angle FB compensating section 142 and the velocity control section 130, basically, the torsional angle $\Delta\theta$ can follow the target torsional angle $\Delta\theta_{ref}$, and the desired steering torque can be obtained.

Next, an effect of the steering angle disturbance compensating section 144 will be described.

Figure 14:
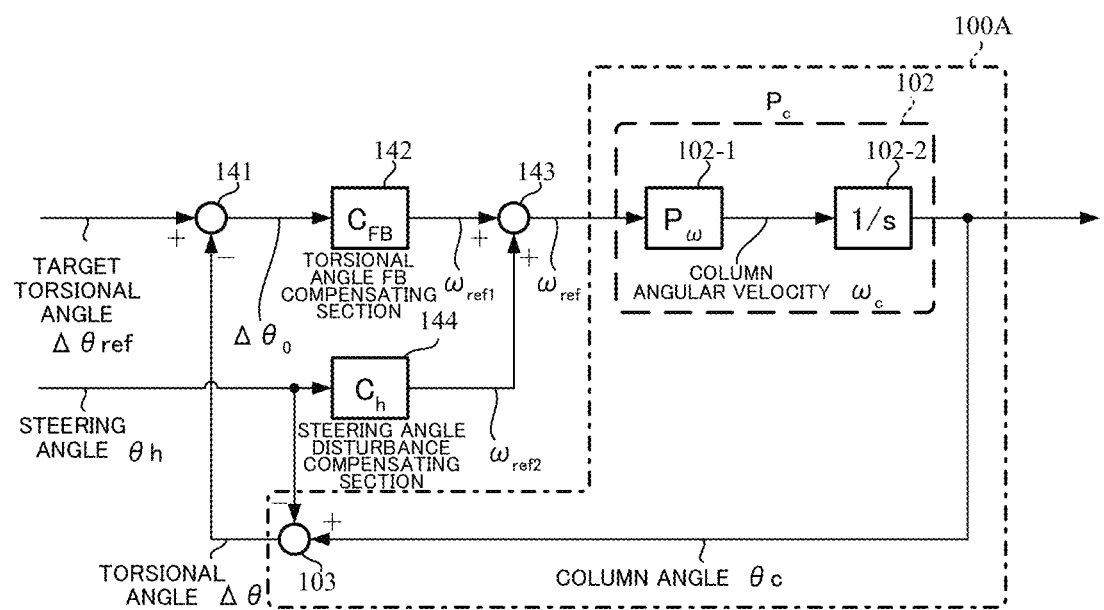
FIG. 14 is a block diagram showing an EPS plant for explaining an effect of a steering angle disturbance compensating section.

As shown in FIG. 14, in an overall system where an EPS steering system/vehicle system 100 includes the velocity control section 130, the target column angular velocity $\omega_{ref}$ is set as an input, the column angle $\theta c$ and the torsional angle $\Delta\theta$ are set as an output, and Pc is set as a transfer function model of the overall system including the velocity control section 130. The torsional angle $\Delta\theta$ is simply a difference ($\theta c-\theta h$) between the column angle $\theta c$ and the steering angle $\theta h$, and is obtained at a subtracting section 103. A transfer function block (P$\omega$) 102-1 including the EPS steering system/vehicle system 100 and the velocity control section 130 is a transfer function model whose input is the target column angular velocity $\omega_{ref}$ and whose output is the column angular velocity $\omega_c$, and includes also an EPS mechanism system characteristics such as the spring constant $K_{tor}$ of the torsion bar 2A and a column inertia, and a dynamic characteristic model of a vehicle. The transfer function block (Pm) 102-1 may or may not include a stabilization compensating section. By time-integrating the column angular velocity $\omega_c$ at an integral block 102-2, the column angle $\theta c$ can be obtained.

Based on FIG. 14, the torsional angle $\Delta\theta$ is expressed by the target torsional angle $\Delta\theta_{ref}$, the transfer function $C_{FB}$ of the torsional angle FB compensating section 142, the transfer function Ch of the steering angle disturbance compensating section 144 and the transfer function Pc of the overall system, and then the following expression 7 is obtained.

$$\Delta\theta = \frac{C_{FB}P_c}{1+C_{FB}P_c}\Delta\theta_{ref} + \frac{C_h P_c - 1}{1+C_{FB}P_c}\theta_h \quad \text{[Expression 7]}$$

The first term of the expression 7 denotes the followability of the torsional angle $\Delta\theta$ to the target torsional angle $\Delta\theta_{ref}$, and the second term of the expression 7 denotes the disturbance characteristic of the steering angle $\theta h$ to the torsional angle $\Delta\theta$. If the second term of the expression 7 is set to "0", theoretically, since the disturbance caused by the steering angle $\theta h$ can be removed, the transfer function Ch of the steering angle disturbance compensating section 144 may be set as the expression 8. That is, if the transfer function Ch of the steering angle disturbance compensating section 144 is set so as to satisfy the expression 8, the affection of the disturbance due to the steering angle $\theta h$ can be suppressed.

$$C_h = \frac{1}{P_c} \quad \text{[Expression 8]}$$

Next, a setting method of the transfer function Ch of the steering angle disturbance compensating section 144 will be described.

Figure 15A:
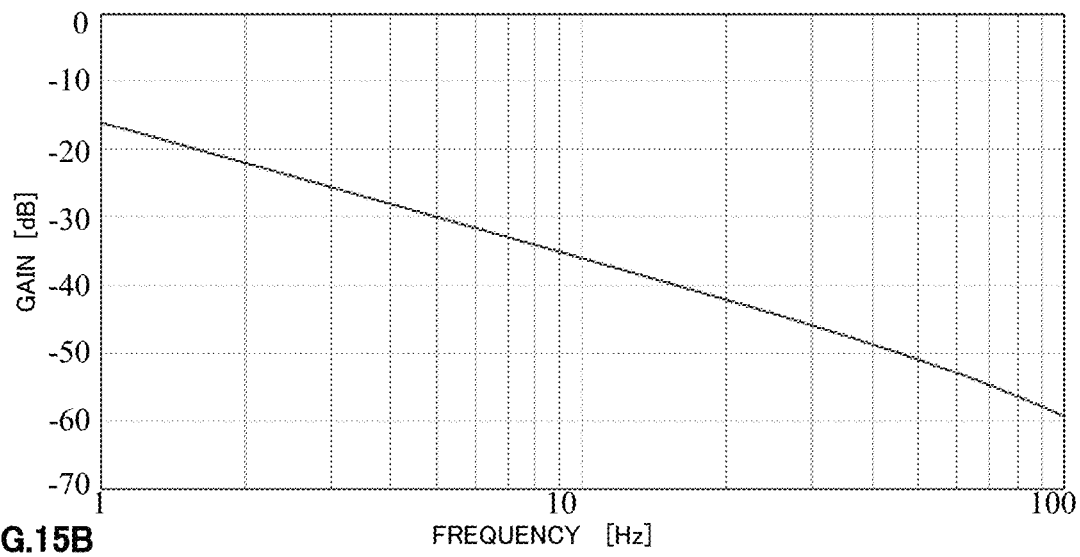
FIGS. 15A and 15B are a Bode diagram explaining a setting method of a steering angle disturbance compensation value.
Figure 15B:
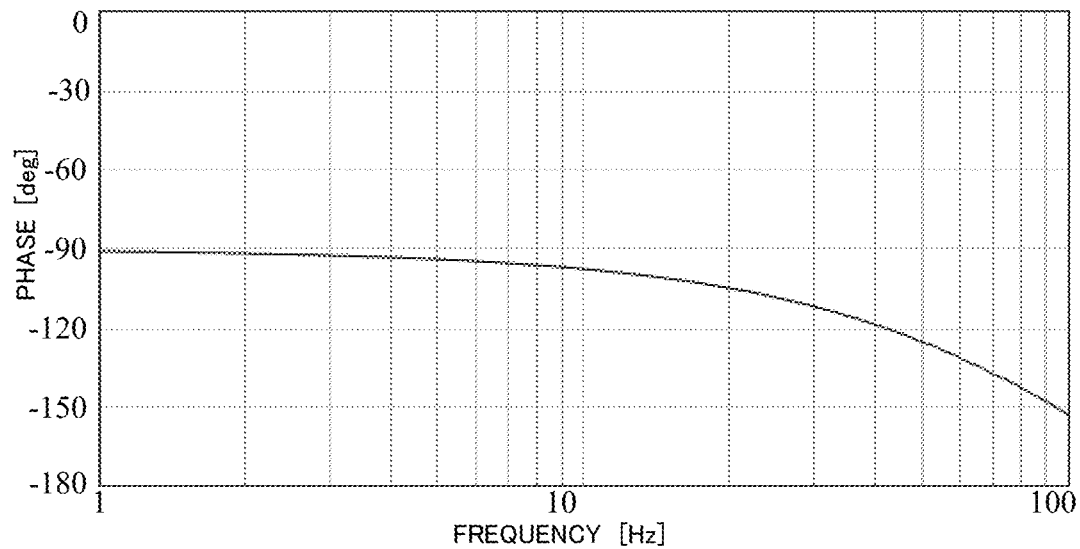
Figure 16A:
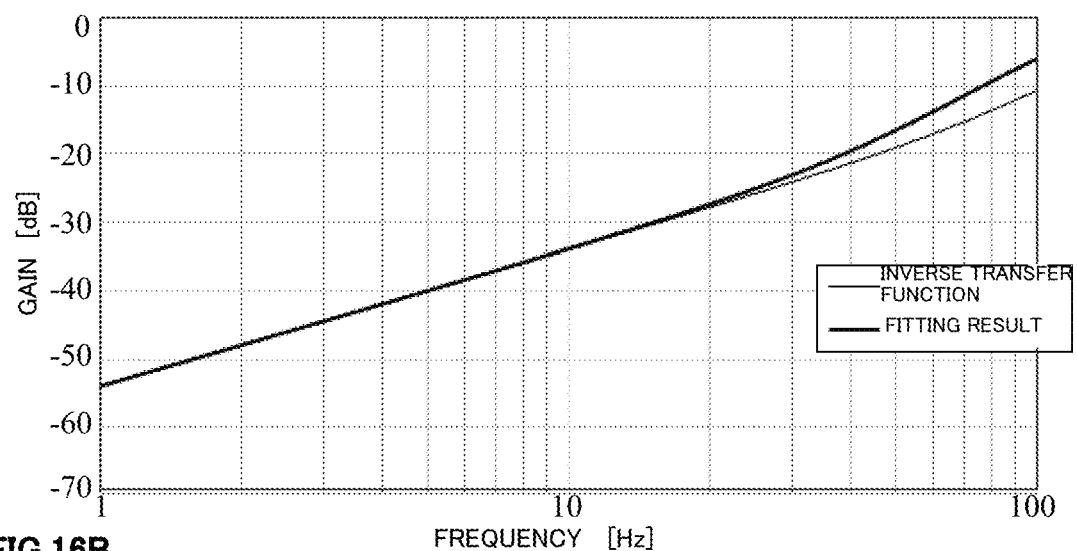
FIGS. 16A and 16B are a Bode diagram showing an inverse transfer function to an identification result and a fitting result.
Figure 16B:
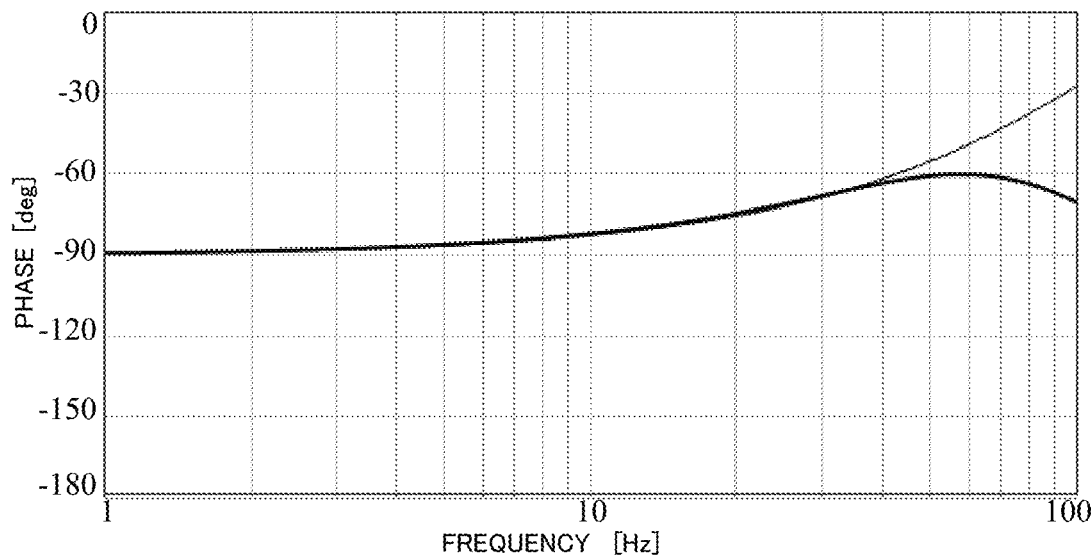

In a simulation, one example of identification results of the frequency characteristic Pc from the target column angular velocity $\omega_{ref}$ to the column angle $\theta c$ is a Bode diagram of FIGS. 15A and 15B. Further, the inverse function to this identification result, that is, the expression 8, and a fitting result to the inverse function are shown in FIGS. 16A and 16B. In FIGS. 16A and 16B, the inverse function is shown by a thin line, and the fitting result is shown by a bold line. The fitted transfer function is set as a third-order filter shown in the following expression 9. The coefficients of the numerator $b_3$ to $b_0$ and the coefficients of the denominator $a_3$ to $a_0$ are obtained by an iterative calculation so as to become coefficients of a filter whose gain and phase are coincident with those shown by the thin lines of FIGS. 16A and 16B.

$$G_{FIT} = \frac{b_3 s^3 + b_2 s^2 + b_1 s + b_0}{a_3 s^3 + a_2 s^2 + a_1 s + a_0} \quad \text{[Expression 9]}$$

| $b_3$ | $9.0000 \times 10^0$ | $a_3$ | $1.5915 \times 10^{-3}$ |
|---|---|---|---|
| $b_2$ | $5.0894 \times 10^3$ | $a_2$ | $3.7000 \times 10^0$ |
| $b_1$ | $8.8826 \times 10^5$ | $a_3$ | $3.1102 \times 10^3$ |
| $b_0$ | $0.0000 \times 10^0$ | $a_0$ | $8.8826 \times 10^5$ |

The above fitting results are set as the transfer function Ch of the steering angle disturbance compensating section 144.

Figure 17:
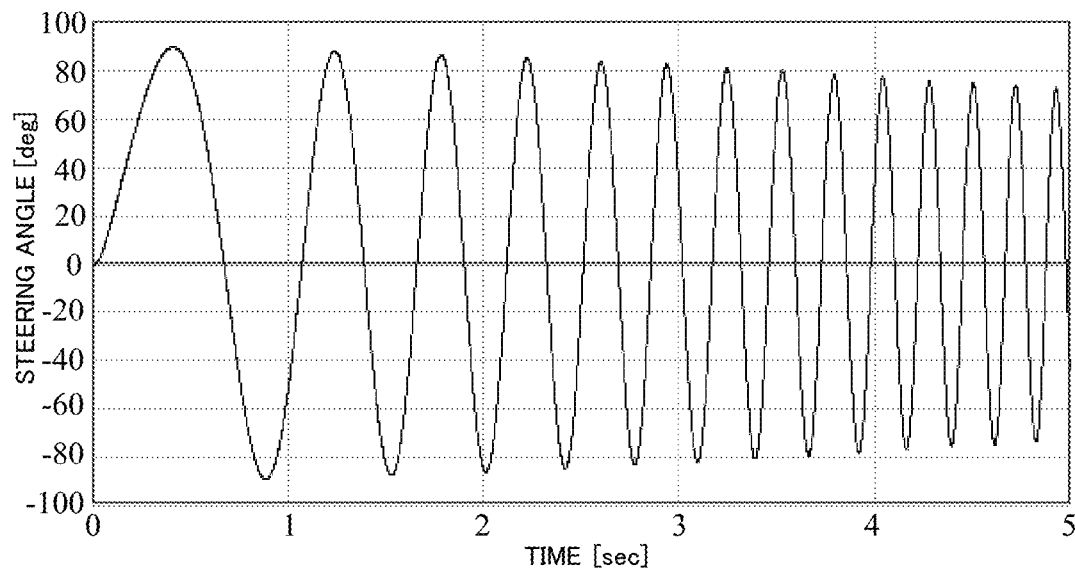
FIG. 17 is a simulation result showing an effect by the steering angle disturbance compensating section.
Figure 18:
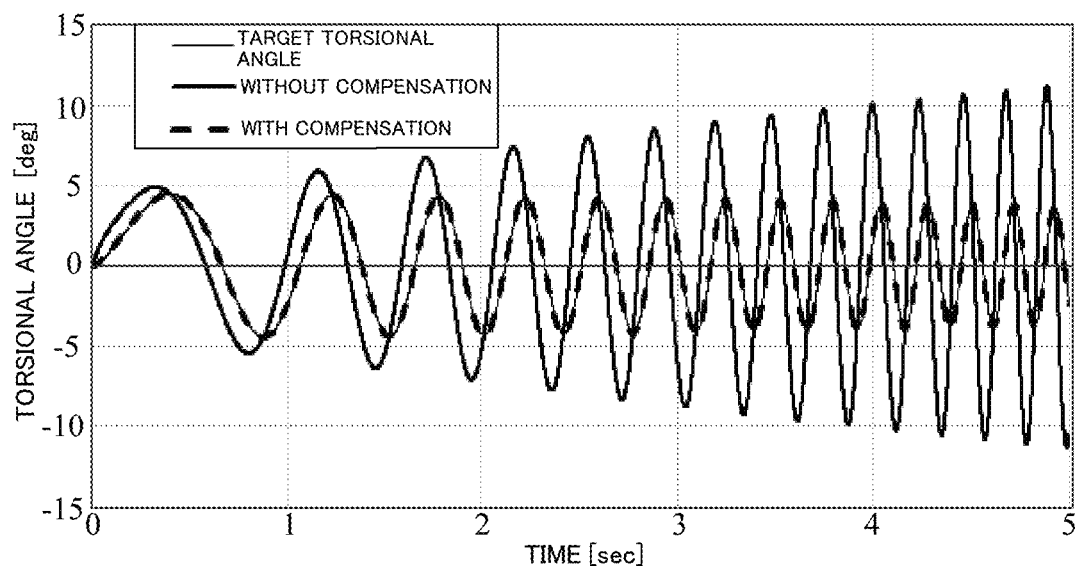
FIG. 18 is a waveform chart showing a difference between with compensation to a target torsional angle and without the compensation.

Next, an effect of the steering angle disturbance compensating section 144 will be described using the simulation result. The setting of the target steering torque generating section 120 is performed at only the basic map. The linear target steering torque is set so that the target torsional angle $\Delta\theta_{ref}$ becomes 5 [deg] when the steering angle $\theta h$ is 100 [deg]. The output $D_G$ of the damper gain map 123 and the output $T_{ref\_c}$ of the hysteresis correcting section 124 are set to 0 [Nm]. FIG. 17 shows a time response of the steering angle $\theta h$ as the steering input and the disturbance. When the time is varied from 0 [sec] to 5 [sec], the frequency component is higher. That is, it is assumed that the input is the abrupt steering. When the steering angle $\theta h$ shown in FIG. 17 is used in both cases where the steering angle disturbance compensation is performed and is not performed, the results shown in FIG. 18 are obtained. Because the lines overlap in FIG. 18, it seems that the distinction of the lines is difficult. The target torsional angle [deg] shown by the thin line almost overlaps with the characteristic in the case of "with the compensation" shown by the broken line. From FIG. 18, it is understood that in the case that the steering angle disturbance compensation is performed (in the case of "with the compensation"), the torsional angle better follows the target torsional angle. Even in the case of the abrupt steering, the torsional angle with the steering angle disturbance compensation follows the target torsional angle, and the desired steering torque is obtained.

Figure 19A:
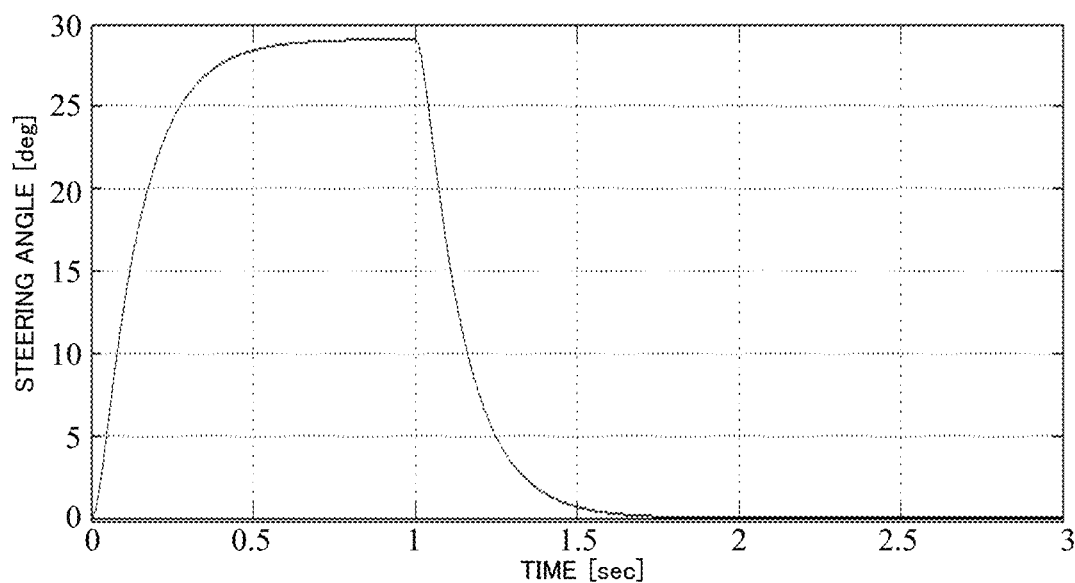
FIGS. 19A and 19B are timing charts showing an effect of the damper gain map.
Figure 19B:
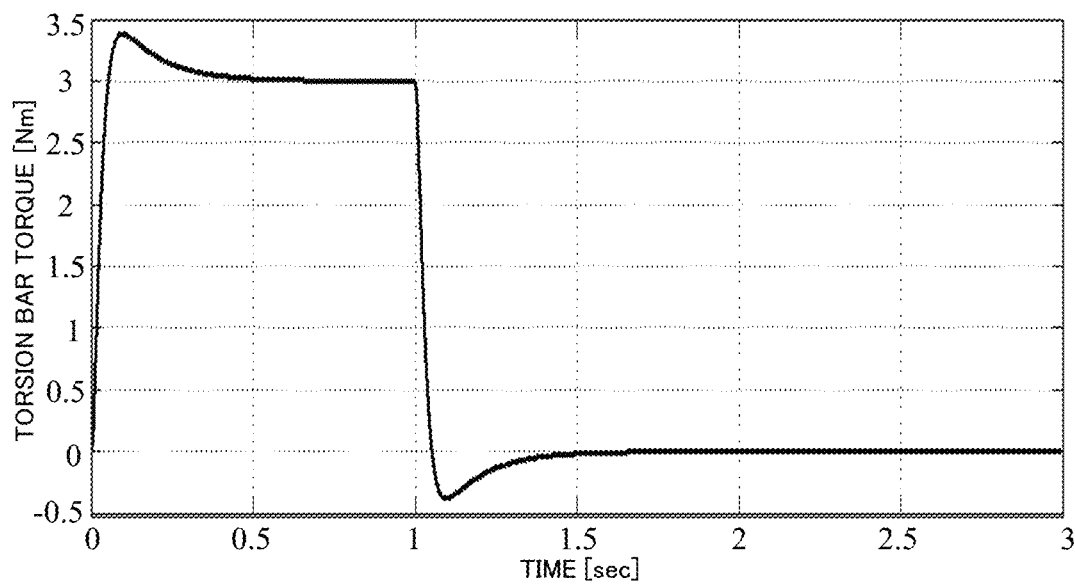
Figure 20A:
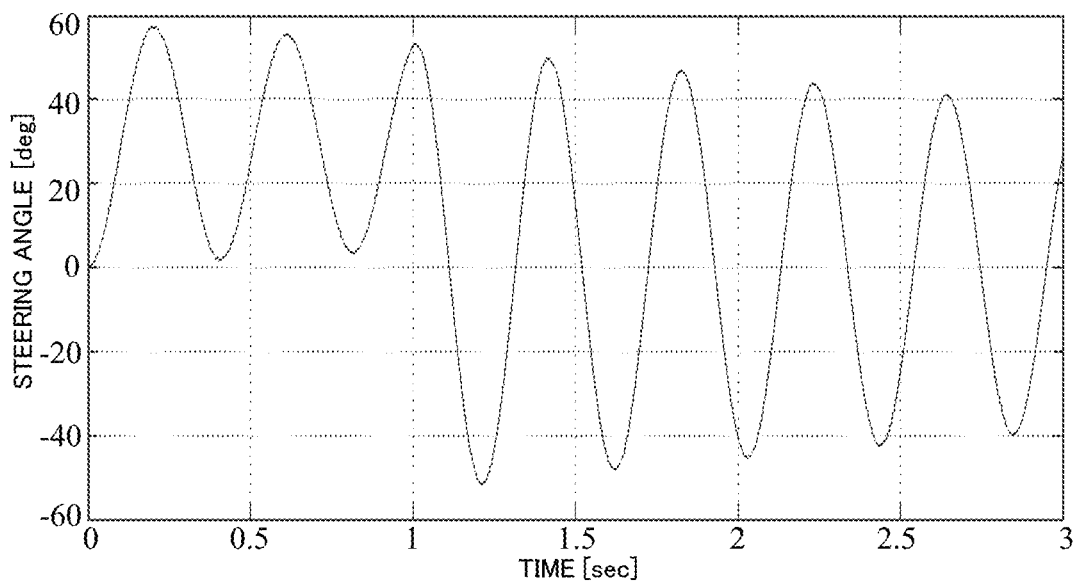
FIGS. 20A and 20B are timing charts showing a characteristic example in the case that the damper gain map is not disposed.
Figure 20B:
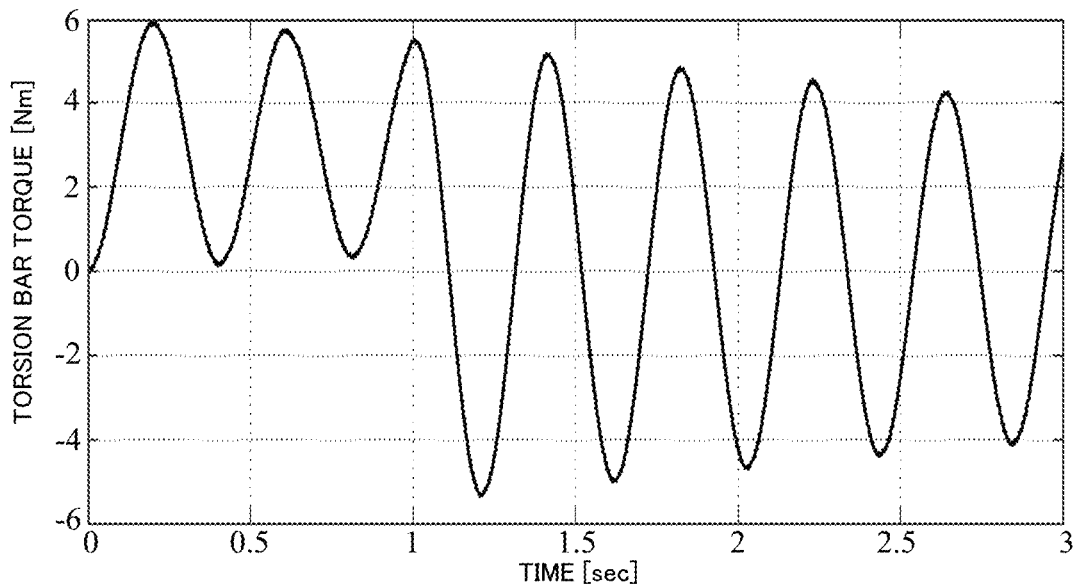

The vehicle speed sensitive damper gain map 123 is disposed in the target steering torque generating section 120. By compensating the target steering torque proportional to the steering angular velocity $\omega_h$, a driver can feel a viscous feeling as steering feeling. In the case of changing from a state where a steering wheel is steered to a state where the driver releases the steering wheel, convergence can be obtained without oscillating the steering wheel, and system stability can be improved. In order to simulate that the driver releases the steering wheel, the simulation is performed by maintaining a state where the manual input with 3 [Nm] from the upper side of the steering wheel 1 is applied from 0 [sec] to 1 [sec], and changing the steering torque to 0 [Nm] after 1 [sec]. FIGS. 19A, 19B, 20A and 20B show the simulation results. As shown in FIG. 19B, it is assumed that the simulation with reference to releasing the steering wheel is performed by maintaining a state where the manual input with 3 [Nm] is applied for 1 [sec] from a start (the steering angle of FIG. 19A is substantially 30 [deg]), and changing the steering torque to 0 [Nm] in a stepwise manner. As shown in FIG. 19A, it is understood that the steering angle is stably converged to 0 [deg]. In contrast, in the case that the damper gain map 123 is not disposed, as shown in FIGS. 20A and 20B, the response to the same manual input torque becomes oscillatory, has a long convergence, and sometimes indicates an oscillation phenomenon by the control.

Figure 21:
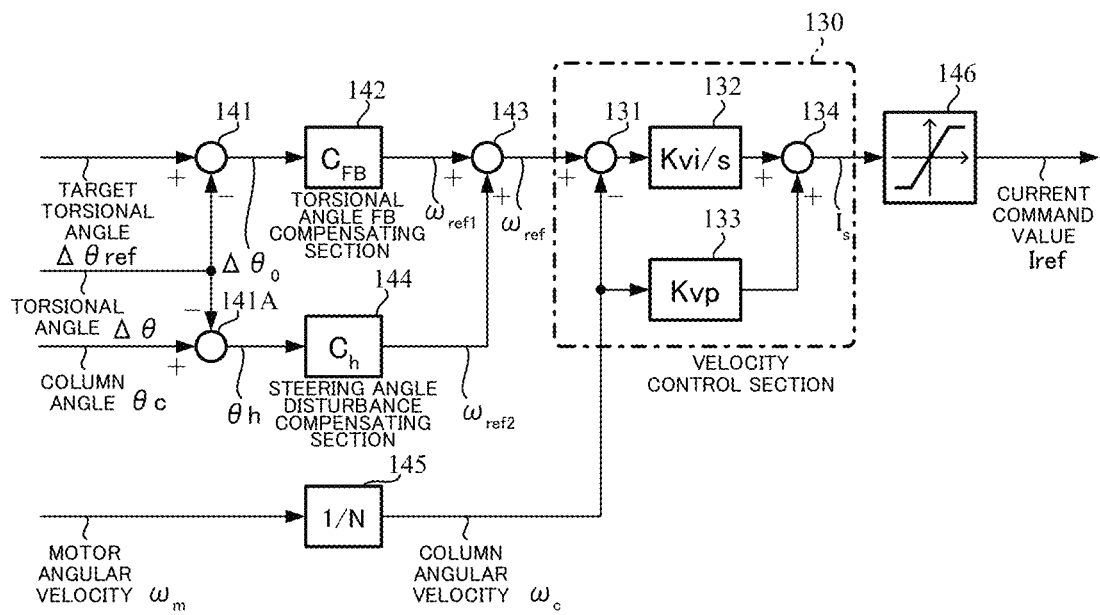
FIG. 21 is a block diagram showing a configuration example (a second embodiment) of the torsional angle control section.

As a configuration example (a second embodiment) shown in FIG. 21, the torsional angle control section 140 inputs the column angle θc of the lower angle of the torsion bar, and may calculate and use the steering angle θh. Thus, the relationship among the torsional angle Δθ, the steering angle θh and the column angle θc is represented by the expression 10.

$$\Delta\theta = \theta c - \theta h \qquad [\text{Expression 10}]$$

The expression 10 is summarized with respected to the steering angle θh, and then the expression 11 is obtained.

$$\theta h = \theta c - \Delta\theta \qquad [\text{Expression 11}]$$

As shown in FIG. 21, since the torsional angle Δθ and the column angle θc are inputted into a subtracting section 141A, and the steering angle θh can be obtained by performing a calculation of the expression 11 at the subtracting section 141A, so that the calculated steering angle θh is inputted into the steering angle disturbance compensating section 144, and the same control performance as described above can be achieved.

Configuration examples (third to fifth embodiments) where the torsional angle control section comprises a stabilization compensating section will be described. By disposing the stabilization compensating section for improving the system stability, a countermeasure to the oscillation phenomenon can be performed.

Figure 22:
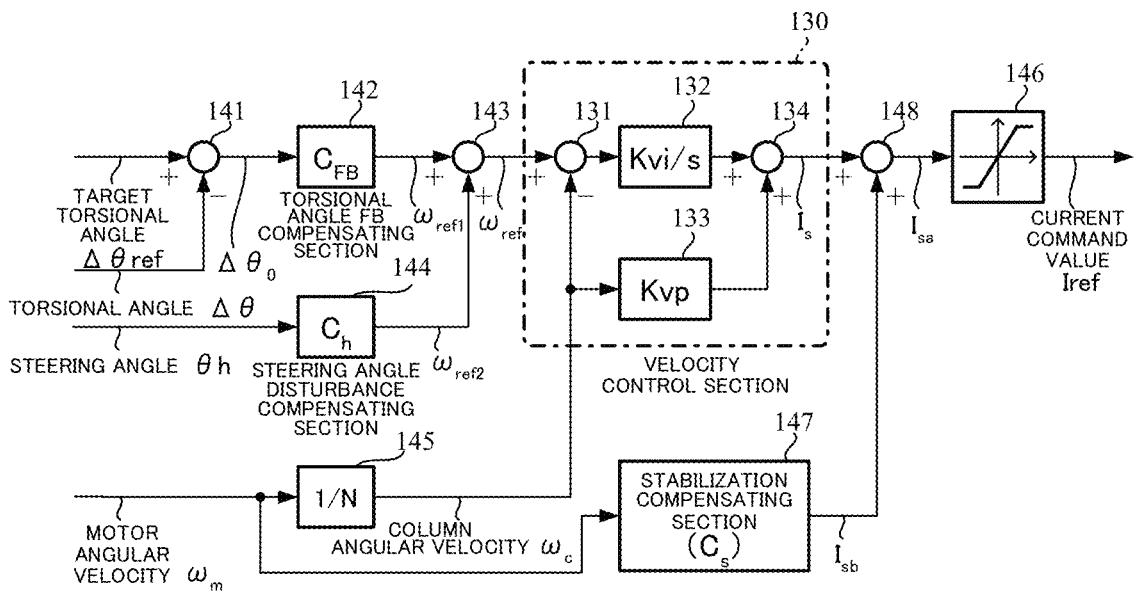
FIG. 22 is a block diagram showing a configuration example (a third embodiment) of the torsional angle control section.
Figure 23:
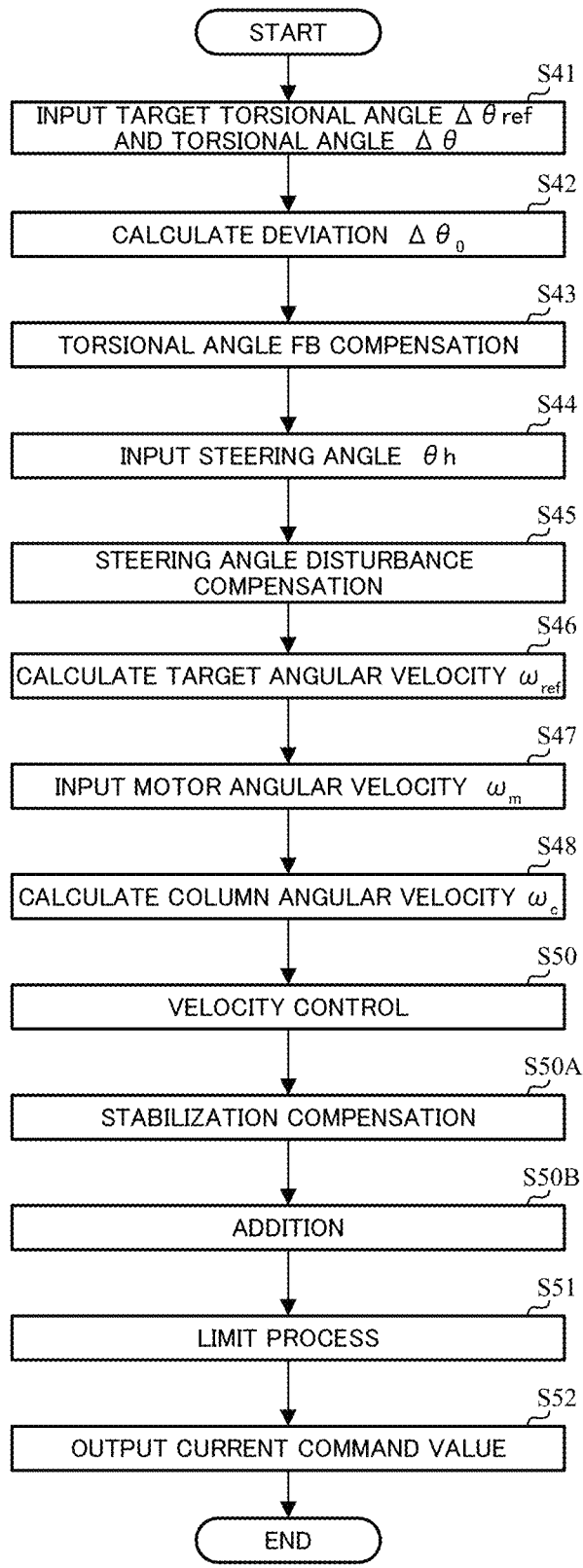
FIG. 23 is a flowchart showing an operating example (the third embodiment) of the torsional angle control section.

FIG. 22 is a block diagram showing a configuration example (the third embodiment) of the torsional angle control section in which the stabilization compensating section with respect to the motor angular velocity $\omega_m$ is disposed. Compared with the torsional angle control section in the first embodiment shown in FIG. 12, a stabilization compensating section 147 and an adding section 148 are added. The motor angular velocity $\omega_m$ is inputted into the stabilization compensating section 147 having a compensation value Cs (a transfer function), and the current command value Isb from the stabilization compensating section 147 is inputted into the adding section 148. In order to improve the followability and the disturbance elimination characteristic, the gains of the torsional angle FB compensating section 142 and the steering angle disturbance compensating section 144 increase, and then the oscillation phenomenon in a high frequency band occurs by the control. As the countermeasure, the transfer function (C$_s$) which is required for the stabilization with respect to the motor angular velocity $\omega_m$ is set at the stabilization compensating section 147. Thereby, the stabilization of the overall EPS control system can be achieved. As the transfer function (C$_s$) of the stabilization compensating section 147, for example, the second-order filter, the fourth-order filter or the like may be used.

The current command value Is from the velocity control section 130 and the current command value Isb from the stabilization compensating section 147 are added at the adding section 148, and the current command value Isa obtained by the addition is inputted into the limiter 146.

Compared the operating example of the torsional angle control section of the third embodiment with the operating example of the torsional angle control section in the first embodiment, in an operating example of the torsional angle control section in the third embodiment, operations of the stabilization compensating section 147 and the adding section 148 (Steps S50A and S50B) are added. That is, the current command value Is outputted from the adding section 134 in the velocity control section 130 is inputted into the adding section 148. The motor angular velocity $\omega_m$ inputted into the reduction ratio section 145 is inputted also into the stabilization compensating section 147, and the stabilization compensation is performed at the stabilization compensating section 147 (Step S50A). The current command value Isb from the stabilization compensating section 147 is inputted into the adding section 148. The addition of the current command values Is and Isb is performed at the adding section 148 (Step S50B), and then the current command value Isa which is the added result is inputted into the limiter 146. The other operations of the torsional angle control section of the third embodiment are the same as those of the first embodiment.

Figure 24A:
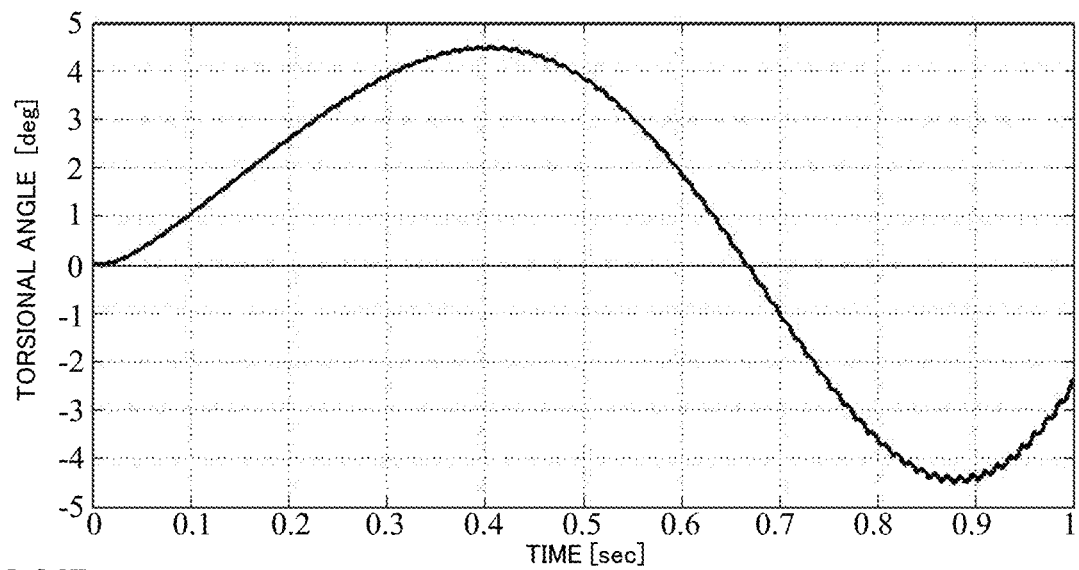
FIGS. 24A and 24B are timing charts showing an effect of a stabilization compensating section.
Figure 24B:
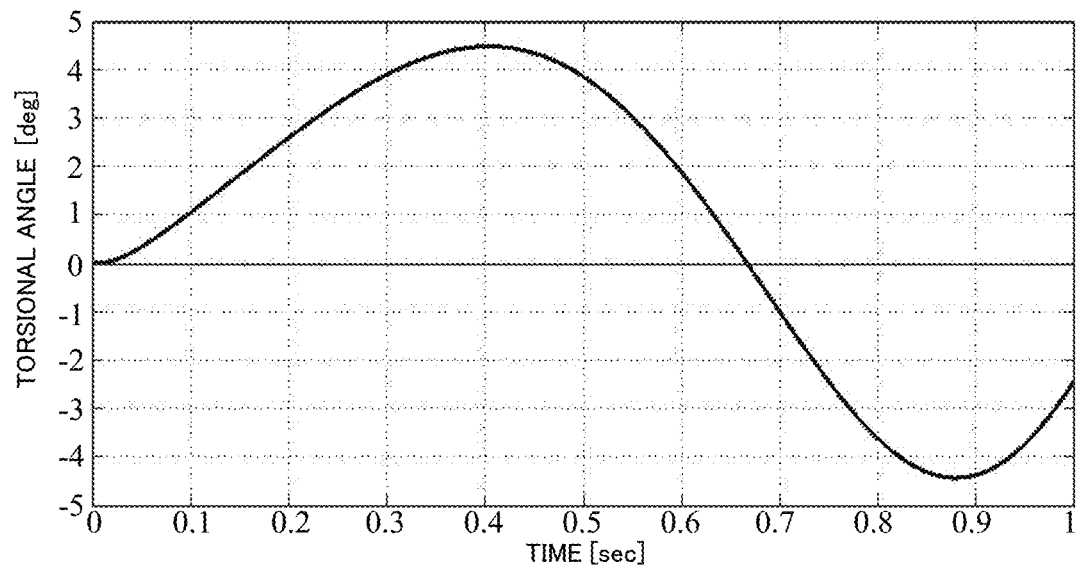

In the case that the same steering angle θh as that shown in FIG. 17 is inputted, a simulation result showing an effect of the stabilization compensating section 147 will be described with reference to FIGS. 24A and 24B. The gain of the torsional angle FB compensating section 142 is adjusted so that the torsional angle behaves oscillatory in the case that the stabilization compensating section 147 is not disposed. A sign of the torsional angle Δθ is adjusted so that the torsional angle Δθ has a positive value in the case that the steering wheel is steered in a direction of increasing the steering angle θh. FIG. 24A shows the characteristic from 0 [sec] to 1 [sec] in the case that the stabilization compensating section 147 is not disposed. FIG. 24B shows the characteristic from 0 [sec] to 1 [sec] in the case that the stabilization compensating section 147 is disposed. It is confirmed that the oscillation and the vibration in the high frequency band by the control are suppressed by providing the stabilization compensating section 147. The lines almost overlap in FIGS. 24A and 24B, the target torsional angle Δθ$_{ref}$ [deg] is shown by the thin line, and the torsional angle Δθ [deg] is shown by the bold line. By providing the stabilization compensating section 147, the gain of the torsional angle FB compensating section 142 can be set to a large value. As a result, the followability to the target torsional angle Δθ$_{ref}$ [deg] can be enhanced. In the present simulation, a primary filter which is defined by the following expression 12 is set for the motor angular velocity $\omega_m$ in the setting of the stabilization compensating section 147.

$$G_{stable} = K_{sta} \frac{\frac{1}{2\pi f_{c1}}s}{\frac{1}{2\pi f_{c1}}s + 1} \qquad [\text{Expression 12}]$$

$$f_{c1} = 150 \text{ [Hz]}$$

Figure 25:
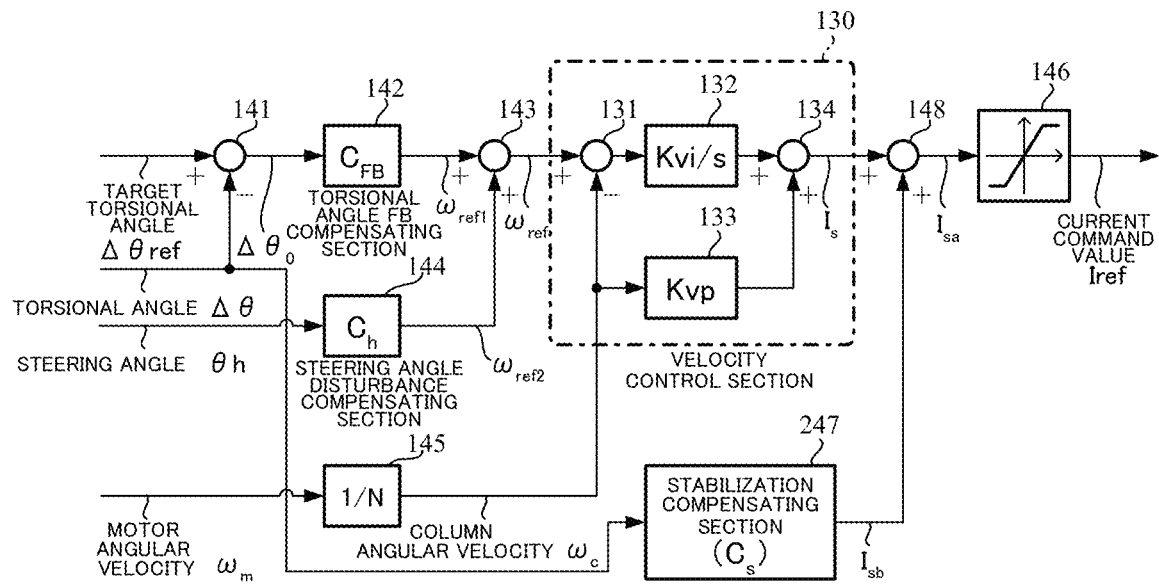
FIG. 25 is a block diagram showing a configuration example (a fourth embodiment) of the torsional angle control section.

FIG. 25 is a block diagram showing a configuration example (the fourth embodiment) of the torsional angle control section in which the stabilization compensating section with respect to the torsional angle Δθ is disposed. Compared with the torsional angle control section of the third embodiment shown in FIG. 22, not the motor angular velocity $\omega_m$ but the torsional angle Δθ is inputted into a stabilization compensating section 247. The other configurations of the torsional angle control section of the fourth embodiment are the same as those of the third embodiment.

Compared with the operating example of the torsional angle control section of the third embodiment, in an operating example of the torsional angle control section of the fourth embodiment, an operation in which the torsional angle Δθ is inputted into the stabilization compensating section 247 is only different. The other operations in the fourth embodiment are the same as those in the third embodiment.

A second-order filter which is defined by the following expression 13 is set for the torsional angle Δθ in the setting of the stabilization compensating section 247 in the fourth embodiment. Thereby, an effect obtained in the fourth embodiment is almost the same as that in the third embodiment. Therefore, an example of a simulation result in the fourth embodiment is omitted.

$$G_{stable} = K_{sta} \frac{\frac{1}{2\pi f_{c1}}s}{\frac{1}{2\pi f_{c1}}s+1} \times \frac{\frac{1}{2\pi f_{c2}}s}{\frac{1}{2\pi f_{c2}}s+1} \quad \text{[Expression 13]}$$

$f_{c1} = 150$ [Hz], $f_{c2} = 200$ [Hz]

Figure 26:
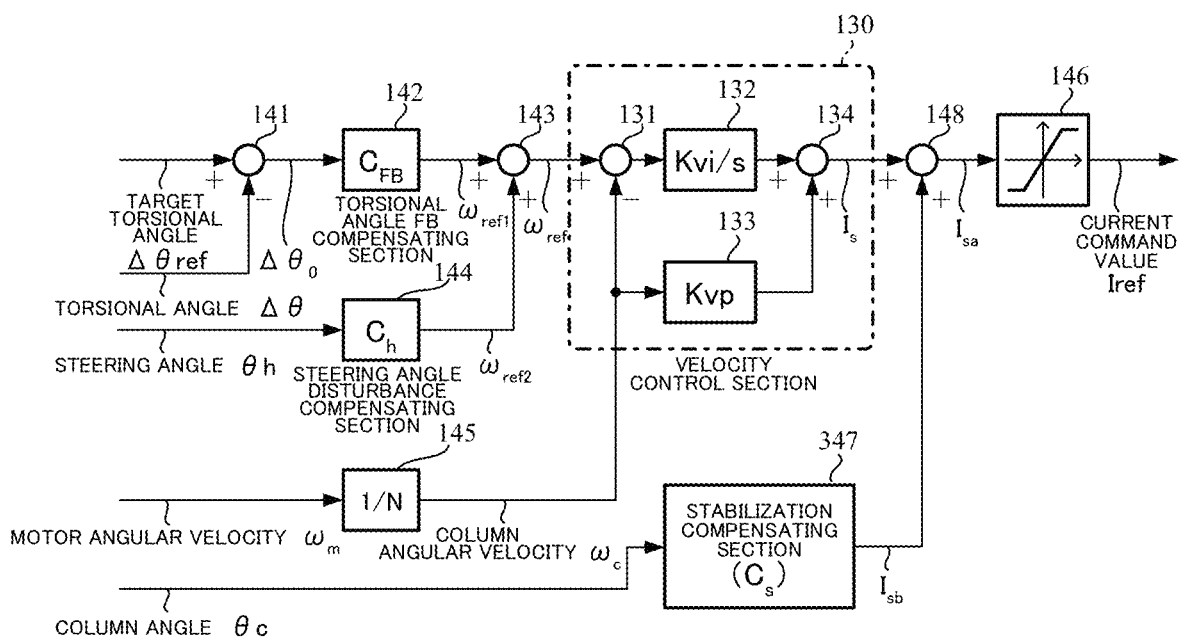
FIG. 26 is a block diagram showing a configuration example (a fifth embodiment) of the torsional angle control section.

FIG. 26 is a block diagram showing a configuration example (the fifth embodiment) of the torsional angle control section in which the stabilization compensating section with respect to the column angle θc is disposed. Compared with the torsional angle control section of the third embodiment shown in FIG. 22, not the motor angular velocity $\omega_m$ but the column angle θc is inputted into a stabilization compensating section 347. The other configurations of the torsional angle control section of the fifth embodiment are the same as those of the third embodiment.

Compared with the operating example of the torsional angle control section of the third embodiment, in an operating example of the torsional angle control section of the fifth embodiment, an operation in which the column angle θc is inputted into the stabilization compensating section 347 is only different. The other operations in the fifth embodiment are the same as those in the third embodiment.

In the third to fifth embodiments, only one stabilization compensating section among the stabilization compensating sections with respect to the motor angular velocity $\omega_m$, the torsional angle Δθ and the column angle θc, is used. Alternatively, an appropriate combination of the respective stabilization compensating sections may be used.

In the above embodiments (the first to fifth embodiments), the basic map 121, the damper gain map 123 and the hysteresis correcting section 124 may be sensitive to the vehicle speed Vs. A phase compensating section may be inserted at a subsequent stage or a previous stage of the basic map 121. For example, in the case that a driver desires a comfortable feeling to steering, a phase advance compensation may be set. A current command value for the conventional assist control, a current command value of a self-aligning torque (SAT) estimation value, or a current command value for steering wheel vibration suppression may be added to the current command value $I_{ref}$ of the torsional angle control section.

Further, in the above embodiments, the proportional preceding type PI-control (the I-P control) is used in the velocity control section. A generally used control such as a PI-control, a proportional (P) control, a proportional integral differential (PID) control, a differential preceding type PID control (a PI-D control), a model matching control or a model reference control may be used in the velocity control section.

In the above embodiments, the steering angular velocity is obtained by the differential calculation to the steering angle θh, and the LPF process to the steering angular velocity is appropriately performed in order to reduce the affection of the noise in the high frequency band. A process using a high pass filter (HPF) and a gain may be used instead of the process using the differential calculation and the LPF. Moreover, a signal obtained by differentiating the detection angle $\theta_1$ of the upper side angle sensor instead of the steering angle θh, and performing the LPF process to the differentiated result, may be used as the steering angular velocity.

The above-described embodiments are merely shown as specific examples (for example, sensor information or control amounts such as the target steering angle, the actual steering angle, the torsion bar torque, the column angle and the motor angular velocity) when embodying the present invention. The technical scope of the present invention is not restrictively interpreted by the above-described embodiments. For example, in the above-described embodiments, the present invention is applied to a column-type EPS. The present invention is not limited to an upstream-type EPS such as the column-type EPS, and can also be applied to a downstream-type EPS such as a rack-and-pinion type EPS. Further, in a viewpoint that the feedback control is performed based on the target torsional angle, the present invention can be applied to a steer-by-wire (SBW) reaction force apparatus which comprises at least a torsion bar whose spring constant is arbitrary and a sensor for detecting the torsional angle. The drawings which are used in the explanation of the above-described embodiments are merely shown as one example, and the present invention is not limited to the above drawings. The relation expressions and the expressions are not limited to the above-described ones, but other relation expressions and other expressions by which the present invention can be realized may be used.

EXPLANATION OF REFERENCE NUMERALS

1 steering wheel
2 column shaft (steering shaft, handle shaft)
3 reduction mechanism
10 torque sensor
12 vehicle speed sensor
14 steering angle sensor
20 motor
30 control unit (ECU)
100 EPS steering system/vehicle system
101 converting section
110 right-turning/left-turning judging section
120 target steering torque generating section
121 basic map
123 damper gain map
124 hysteresis correcting section
130 velocity control section
140 torsional angle control section 142 torsional angle feedback (FB) compensating section
144 steering angle disturbance compensating section
147, 247, 347 stabilization compensating section

The invention claimed is:

1. An electric power steering apparatus that comprises a torsion bar which is provided in a column shaft of a steering wheel of a vehicle, and assist-controls a steering system by driving and controlling a motor connected to said column shaft based on a current command value, comprising:
 a target steering torque generating section to generate a target steering torque based on vehicle driving information,
 a converting section to convert said target steering torque into a target torsional angle, and
 a torsional angle control section to input at least said target torsional angle and a torsional angle of said torsion bar and calculate said current command value so that said torsional angle follows said target torsional angle;
 wherein said torsional angle control section comprises:
 a torsional angle feedback compensating section to output a first target column angular velocity corresponding to a deviation between said target torsional angle and said torsional angle,
 a velocity control section to output said current command value based on said first target column angular velocity,
 a steering angle disturbance compensating section to output a second target column angular velocity corresponding to said vehicle driving information, and
 an angular velocity converting section to convert a motor angular velocity into a column angular velocity; and
 wherein said electric power steering apparatus performs a control so that a detection torque of said torsion bar follows a value depending on said vehicle driving information.

2. The electric power steering apparatus according to claim 1,
 wherein, in said torsional angle control section, a third target column angular velocity that is a value obtained by adding said first target column angular velocity and said second target column angular velocity, and said column angular velocity are inputted into said velocity control section, and said velocity control section performs an integral of a deviation between said third target column angular velocity and said column angular velocity, subtracts a proportional value of said target column angular velocity from an integral value of said integral, and outputs said current command value.

3. The electric power steering apparatus according to claim 1,
 wherein said torsional angle control section further comprises
 a stabilization compensating section to set a transfer function to said motor angular velocity for improving stability of an overall system.

4. The electric power steering apparatus according to claim 3,
 wherein said transfer function is a primary filter or a second order filter.

5. The electric power steering apparatus according to claim 1,
 wherein said torsional angle control section further comprises
 a stabilization compensating section to set a transfer function to said torsional angle for improving stability of an overall system.

6. The electric power steering apparatus according to claim 5,
 wherein said transfer function is a second order filter or a fourth filter.

7. The electric power steering apparatus according to claim 1,
 wherein said torsional angle control section further comprises
 a stabilization compensating section to set a transfer function to a column angle for improving stability of an overall system.

8. The electric power steering apparatus according to claim 7,
 wherein said transfer function is a second order filter or a fourth filter.

9. The electric power steering apparatus according to claim 1,
 wherein a steering state which indicates right-turning or left-turning of said steering wheel is inputted into said target steering torque generating section.

10. The electric power steering apparatus according to claim 9,
 wherein said target steering torque generating section comprises
 a basic map to output a first torque signal being vehicle speed sensitive, depending on said vehicle driving information,
 a damper gain section to output a second torque signal obtained by multiplying a differential value of said vehicle driving information by a vehicle speed sensitive damper gain,
 a hysteresis correcting section to output a third torque signal obtained by performing hysteresis correction to said vehicle driving information depending on said steering state, and
 an output section to output said target steering torque by adding at least one of said second torque signal and said third torque signal to said first torque signal.

11. The electric power steering apparatus according to claim 10,
 wherein said vehicle speed sensitive damper gain has a characteristic where a value of said vehicle speed sensitive damper gain gradually increases as said vehicle speed increases.

12. The electric power steering apparatus according to claim 10,
 wherein said hysteresis correcting section performs said hysteresis correction to said vehicle driving information using a function, switches said function when said steering state is switched to right turning or to left turning, and updates an offset adjustment value to said vehicle driving information when said function is switched.

13. The electric power steering apparatus according to claim 12,
 wherein said offset adjustment value is calculated using previous values of said vehicle driving information and said third torque signal.

14. The electric power steering apparatus according to claim 1,
 wherein a limiter which limits upper and lower limit values is disposed at a subsequent stage of said velocity control section.

15. The electric power steering apparatus according to claim 1,
 wherein said torsional angle feedback compensating section is comprised of a gain value of a transfer function.

16. The electric power steering apparatus according to claim 1,
   wherein said steering angle disturbance compensating section is comprised of a value of a transfer function for suppressing affection to said torsional angle due to variation of said vehicle driving information, and improving followability of said torsional angle to said target torsional angle against abrupt steering.

17. The electric power steering apparatus according to claim 16,
   wherein a value of said transfer function of said steering angle disturbance compensating section is determined from a frequency transfer function of said steering system and a vehicle system model.

18. The electric power steering apparatus according to claim 1,
   wherein said vehicle driving information includes a steering angle, a vehicle speed and a steering state.

* * * * *